(12) United States Patent
Sacli

(10) Patent No.: US 8,128,110 B2
(45) Date of Patent: Mar. 6, 2012

(54) SUSPENSION SYSTEM PROVIDING TWO DEGREES OF FREEDOM

(75) Inventor: Melih Sacli, Thousand Oaks, CA (US)

(73) Assignee: Sacli Suspension, LLC, Chatsworth, CA (US)

( * ) Notice: Subject to any disclaimer, the term of this patent is extended or adjusted under 35 U.S.C. 154(b) by 44 days.

(21) Appl. No.: 12/420,977

(22) Filed: Apr. 9, 2009

(65) Prior Publication Data

US 2009/0256326 A1   Oct. 15, 2009

Related U.S. Application Data

(60) Provisional application No. 61/123,688, filed on Apr. 10, 2008.

(51) Int. Cl.
   *B60G 21/05*   (2006.01)
(52) U.S. Cl. .......... 280/124.106; 280/5.508; 280/86.75; 280/86.751; 280/124.1; 280/124.104; 280/124.134
(58) Field of Classification Search ........... 280/86.75, 280/86.751, 86.757, 124.1, 124.103, 124.104, 280/124.106, 124.107, 124.134, 124.135, 280/124.138, 124.15
See application file for complete search history.

(56) References Cited

U.S. PATENT DOCUMENTS

| | | | | |
|---|---|---|---|---|
| 4,072,325 A * | 2/1978 | Bright et al. | ............ | 280/5.521 |
| 4,515,390 A * | 5/1985 | Greenberg | ............ | 280/124.102 |
| 4,546,997 A * | 10/1985 | Smyers | ............ | 280/5.509 |
| 4,632,413 A * | 12/1986 | Fujita et al. | ............ | 280/124.103 |
| 4,927,169 A * | 5/1990 | Scaduto | ............ | 280/5.521 |
| 5,000,476 A * | 3/1991 | Lindorfer et al. | ...... | 280/124.107 |
| 5,326,121 A * | 7/1994 | Fisher | ............ | 280/282 |
| 5,765,846 A * | 6/1998 | Braun | ............ | 280/124.103 |
| 5,823,517 A * | 10/1998 | Huang et al. | ............ | 267/221 |
| 6,170,838 B1 * | 1/2001 | Laurent et al. | ............ | 280/5.508 |
| 6,267,387 B1 * | 7/2001 | Weiss | ............ | 280/5.52 |
| 6,390,484 B1 * | 5/2002 | Green et al. | ............ | 280/124.106 |
| 6,511,078 B2 * | 1/2003 | Sebe | ............ | 280/5.509 |
| 6,550,797 B2 * | 4/2003 | Wagner | ............ | 280/124.136 |
| 6,637,758 B2 * | 10/2003 | Woo | ............ | 280/5.521 |
| 6,719,313 B2 * | 4/2004 | Zadok | ............ | 280/124.106 |
| 6,722,676 B2 * | 4/2004 | Zadok | ............ | 280/124.106 |
| 7,234,708 B2 * | 6/2007 | Blondelet et al. | ......... | 280/5.521 |
| 7,255,357 B2 * | 8/2007 | Wagner | ............ | 280/124.135 |
| 7,357,400 B2 * | 4/2008 | Serra | ............ | 280/86.751 |
| 7,407,173 B2 * | 8/2008 | Walker | ............ | 280/124.134 |
| 7,487,985 B1 * | 2/2009 | Mighell | ............ | 280/124.103 |
| 7,530,419 B2 * | 5/2009 | Brudeli | ............ | 180/210 |
| 7,568,541 B2 * | 8/2009 | Pfeil et al. | ............ | 180/210 |
| 7,591,337 B2 * | 9/2009 | Suhre et al. | ............ | 180/210 |
| 7,607,695 B2 * | 10/2009 | Moulene et al. | ............ | 280/775 |
| 7,628,414 B2 * | 12/2009 | Dobson et al. | ............ | 280/124.106 |
| 7,665,749 B2 * | 2/2010 | Wilcox | ............ | 280/124.103 |
| 7,712,748 B2 * | 5/2010 | Deal et al. | ............ | 280/5.521 |
| 7,850,180 B2 * | 12/2010 | Wilcox | ............ | 280/124.103 |
| 7,950,680 B2 * | 5/2011 | Christensen | ......... | 280/124.135 |
| 7,967,306 B2 * | 6/2011 | Mighell | ............ | 280/124.103 |

(Continued)

*Primary Examiner* — Paul N Dickson
*Assistant Examiner* — James English
(74) *Attorney, Agent, or Firm* — Kelly & Kelley, LLP

(57) ABSTRACT

A combination of existing suspension designs is provided to suspend moving vehicles such as cars, trucks, planes, and snowmobiles and provide two degrees of freedom in the wheels or skis. The design combines a dive suspension with a roll suspension, including a locking linkage. The locking linkage locks out the roll suspension during dive, jounce, flight or two-wheel bump motion. Both the dive and roll suspensions are responsive during roll motion and one-wheel bump motion.

32 Claims, 20 Drawing Sheets

U.S. PATENT DOCUMENTS

| | | | |
|---|---|---|---|
| 2004/0178600 A1* | 9/2004 | Wagner | 280/124.135 |
| 2005/0275181 A1* | 12/2005 | MacIsaac | 280/124.103 |
| 2006/0027990 A1* | 2/2006 | Dobson et al. | 280/124.106 |
| 2006/0091635 A1* | 5/2006 | Cook | 280/124.106 |
| 2006/0186626 A1* | 8/2006 | Serra | 280/86.75 |
| 2007/0126199 A1* | 6/2007 | Peng et al. | 280/124.103 |
| 2007/0176386 A1* | 8/2007 | Schlangen et al. | 280/124.135 |
| 2007/0182120 A1* | 8/2007 | Tonoli et al. | 280/124.142 |
| 2007/0193815 A1* | 8/2007 | Hobbs | 180/348 |
| 2008/0012262 A1* | 1/2008 | Carabelli et al. | 280/124.106 |
| 2008/0036168 A1* | 2/2008 | Wagner | 280/124.138 |
| 2008/0224436 A1* | 9/2008 | MacIsaac | 280/124.103 |
| 2008/0238005 A1* | 10/2008 | James | 280/5.509 |
| 2008/0244394 A1* | 10/2008 | Boyer et al. | 715/700 |
| 2008/0258415 A1* | 10/2008 | Melcher | 280/124.103 |
| 2009/0026725 A1* | 1/2009 | Haeusler et al. | 280/124.135 |

* cited by examiner

SUSPENSION SYSTEM PROVIDING TWO DEGREES OF FREEDOM

BACKGROUND OF THE INVENTION

The present invention is concerned with suspensions for vehicles that provide two degrees of freedom in the wheels, skis or other points of contact with a surface. More particularly, the present invention is directed to a novel combination of existing suspension designs that can work simultaneously depending upon the loading scenario and desired response from the suspension.

It has been a challenge for suspension designers and engineers to come up with suspension systems that control the camber angle change in an unsprung mass. Whether the unsprung mass is a tire/wheel assembly on a car or skis on a snowmobile, its position with respect to the ground always has dramatic effects on grip and vehicle handling. Existing suspension types such as Macpherson strut, double a-arm (double wishbone), solid-axle, swing axle and trailing arm, to name a few, all only provide good camber control at roll or dive or bump or a combination of two out of the three.

Usually a suspension that has excellent camber control at roll will suffer at bump and dive, while a suspension that has excellent camber control during dive and bump will have less than ideal camber control during roll. Most common suspensions like Macpherson strut and double a-arm suspension can be designed to have acceptable (a relative term) camber angle control at all three cases (bump, dive and roll).

Existing suspension systems provide only one line of motion for the wheel at all times with respect to the vehicle frame/body. At any given time an instant center for the suspension linkage of the wheel can be located on the existing suspension designs. This leads to the known problem of not being able to optimize the dive and roll scenarios simultaneously. There have been some interesting attempts at solving this problem; designs such as Treborn Double Roll Suspension or Orton High Performance Automobile Suspension are some tries that cannot passively provide a stable or working solution to replace the existing commonly used suspension designs mentioned above.

It is therefore an object of the present invention to provide a suspension system that has good bump and dive camber control simultaneously with good roll camber control. Such a suspension system would achieve good results at bump, dive, roll and all combinations of the three. It is a further object of the present invention to provide a suspension system that isolates the response of the suspension system to vertical loads causing bump and dive motion from lateral loads causing roll motion. It is yet a further object of the present invention to provide a suspension system that locks out or isolates a roll suspension from reacting to vertical loads, thus minimizing the undesirable effects of a roll suspension during dive and bump scenarios. It is still a further object of the present invention to provide a suspension system that allows response from both roll and dive suspensions under lateral loads resulting in a coupled camber angle control of the wheel from both suspensions.

The present invention fulfills these needs and provides other related advantages.

SUMMARY OF THE INVENTION

The present invention is directed to a suspension system for a wheel or ski having two degrees of freedom with respect to a body of a vehicle. The suspension system comprises a roll suspension mechanism, a dive suspension mechanism, a suspension linkage and a locking linkage. The roll suspension mechanism is attached to the body and provides a pre-determined amount of camber control during roll motion. The dive suspension mechanism is attached to the wheel or ski and provides a pre-determined amount of camber control during dive and bump motion. The suspension linkage connects the roll suspension mechanism to the dive suspension mechanism.

The locking linkage is connected to the roll suspension mechanism and is configured to regulate responsiveness of the roll suspension mechanism. The locking linkage locks out the roll suspension mechanism during dive motion such that only the dive suspension mechanism is responsive. Further, the locking linkage activates the roll suspension mechanism during roll or one-wheel bump motion such that both the dive and roll suspension mechanisms are simultaneously responsive. The locking linkage may be a solid link, a hydraulic link or a cable system.

The vehicle may include two or more wheels or skis, each wheel or ski having dive suspension and roll suspension mechanisms associated therewith. The suspension linkage may comprise upper and lower control arms, an a-arm, a strut, a swing arm, an I-beam or a trailing arm. The suspension linkage preferably comprises upper and lower control arms, wherein the lower control arm connects the body to a lower end of a strut in the dive suspension mechanism and the upper control arm of the suspension linkage is crossed with the lower control arm such that it connects a lower portion of the body to an upper end of the strut in the dive suspension mechanism.

The dive suspension mechanism preferably comprises an adjustable strut, dampener and spring assembly. The dive suspension mechanism may further comprise a dive upright attached to the wheel or ski. Upper and lower frame arms are connected to upper and lower ends of the dive upright. An upper end of a frame upright is connected adjacent to a distal end of the upper frame arm and a lower end of the frame upright is connected adjacent to a distal end of the lower frame arms, in relation to the dive upright. In this configuration, a lower end of the strut, dampener and spring assembly is connected adjacent to the lower end of the dive upright and an upper end of the strut, dampener and spring assembly is connected adjacent to the upper end of the frame upright. Further, the suspension linkage would be connected to both the upper and lower ends of the frame upright.

The roll suspension mechanism preferably comprises a roll bell crank pivotally attached to an upper portion of the body and an adjustable roll dampener connecting the roll bell crank to another portion of the body. In this configuration, the roll dampener regulates pivotal movement of the roll bell crank. Further, a push rod connects the roll bell crank to a lower end of the dive suspension mechanism. The locking linkage is connected to the roll bell crank and restricts pivotal movement thereof.

Alternatively, the roll suspension mechanism may comprise a pair of hydraulic shocks mounted on opposite sides of the body. An upper end of each hydraulic shock is attached to an upper portion of the body. The lower end of each hydraulic shock is attached proximate to a lower end of the dive suspension mechanism. In this configuration, the locking linkage is preferably a hydraulic linkage between the pair of hydraulic shocks such that the pair of hydraulic shocks are prevented from both extending or both contracting simultaneously.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
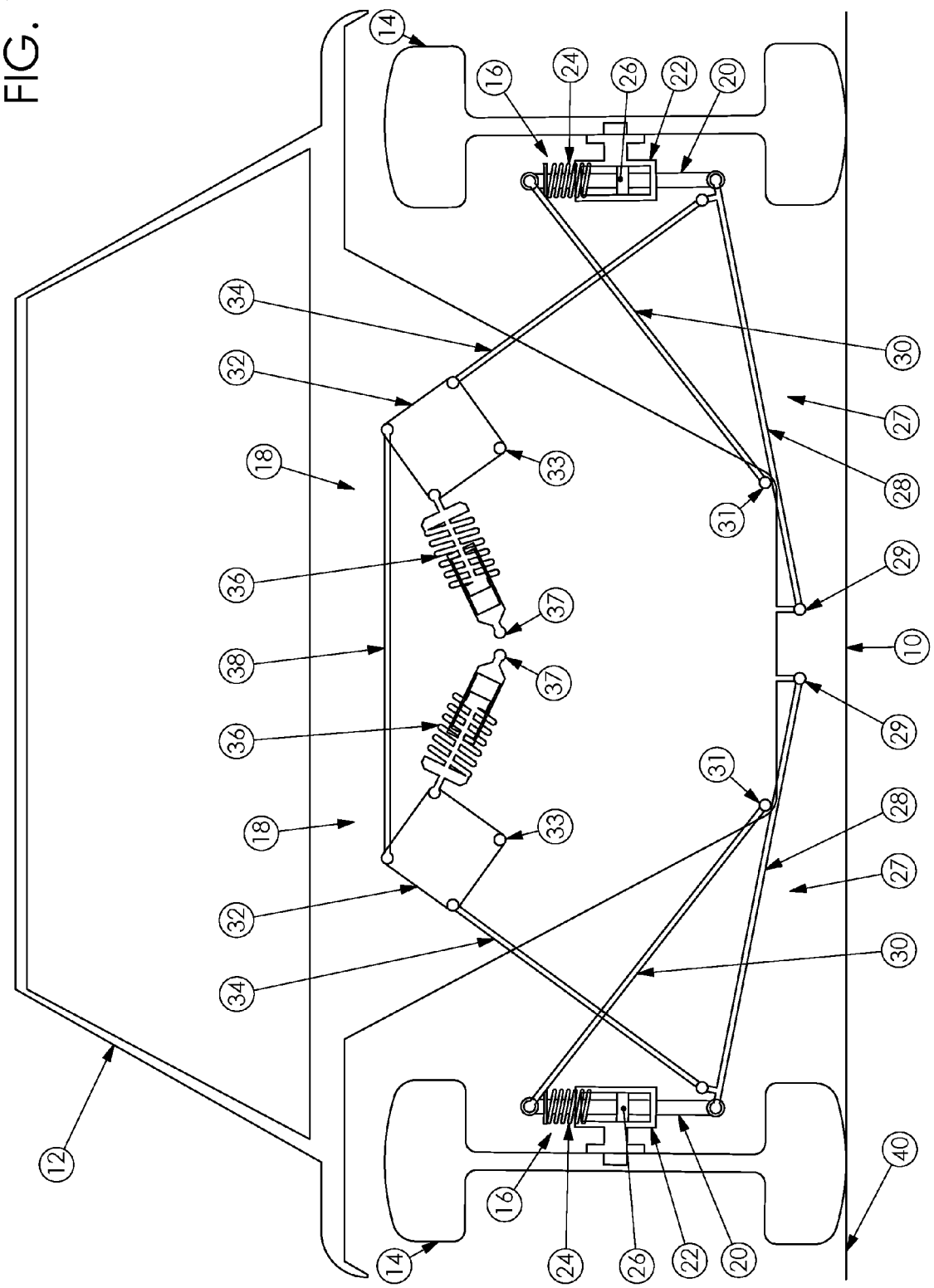
FIG. 1 illustrates an a-arm to strut design of the inventive suspension at ride height.

The present invention relates to a suspension design for use with a moving vehicle that provides two degrees of freedom to the wheels or skis with respect to the body of the vehicle. The inventive suspension generally involves combining two single degree of freedom wheel linkages to achieve wheel motion that has two degrees of freedom with respect to the vehicle frame/body. Such allows the wheel to follow many separate lines of motion based on the loading scenario. Many combinations of suspension are possible within the present invention, including but not limited to double-arm to strut (D-S), double arm to double arm (D-D), double arm to trailing arm (D-T), swing arm to double arm (S-D), swing arm to strut (S-S), and swing arm to trailing arm (S-T). Double arm is used interchangeably with a-arm. The inventive suspensions presented herein have close to a linear line of motion (translation) during dive or vertical loading scenarios and a very aggressive curve that rolls the wheel inward for camber recovery during roll or lateral loading scenarios.

The inventive suspensions are not limited to the specific suspension linkage geometry/designs presented. Such specific designs are provided to help explain the principles of the invention. Although multiple embodiments are described herein, the same reference numerals will be used to describe similar components on the embodiments.

FIGS. 1-5 illustrate an a-arm to strut design linkage of the inventive suspension described herein. FIGS. 6-10 illustrate an a-arm to a-arm design linkage of the inventive suspension described herein. FIGS. 11-15 illustrate a swing arm to a-arm design linkage of the inventive suspension described herein. FIGS. 16-20 illustrate an a-arm to a-arm design using a hydraulic lock linkage of the inventive suspension described herein.

A-Arm to Strut Designs

FIGS. 1-5 illustrate a preferred embodiment of the inventive suspension design, generally referred to by reference numeral 10. The suspension design 10 connects a vehicle body 12 to the wheels 14 on the vehicle. The wheels 14 may also comprise skis or other implements upon which a vehicle rests when on a surface. The suspension design 10 includes a dive suspension 16 and a roll suspension 18 connected by an a-arm to strut design. Each of the connections described herein are pivoting connections so that one element may pivot with respect to the element to which it is connected. Connections that do not pivot will be specifically identified in the detailed description.

The dive suspension 16 is connected to a wheel 14 and includes a strut 20, dampener 22 and spring 24. This connection between the dive suspension 16 and the wheel 14 is rigid such that it does not pivot. The strut 20, dampener 22 and spring 24 may comprise an assembly 26 such as a shock absorber commonly found in prior art suspension systems.

The roll suspension 18 comprises a roll bell crank 32 connected to an upper portion of the vehicle body 12. Pin 33 indicates a possible point for connecting the roll bell crank 32 to the body 12. A pushrod 34 connects the roll bell crank 32 to the lower end of the dive suspension 16. A roll dampener 36 is attached at one end to the roll bell crank 32 and at another end to the vehicle body 12. Pin 37 indicates a point of attachment between the roll dampener 36 and the body 12. This roll dampener 36 is similar to a shock absorber and regulates pivotal movement of the roll bell crank 32. The dampener 22 and roll dampener 36 are both adjustable so as to regulate the response of the dive and roll suspensions 16, 18 in the various categories of motion.

A suspension linkage 27 connects the roll suspension 18 to the dive suspension 16. The suspension linkage 27 may comprise upper and lower control arms (sometimes referred to as a-arms or double arms), a strut, a swing arm, an I-beam, a trailing arm or any other linkage systems used in the art. FIGS. 1-5 illustrate a suspension linkage 27 that uses a lower control arm 28 and an upper control arm 30. The lower control arm 28 is connected to a lower end of the dive suspension 16 and a low portion or underside 29 of the body 12. The upper control arm 30 is connected to an upper end of the dive suspension 16 and a low portion 31 of the body 12. The upper and lower control arms 28, 30 are configured such that their respective points of connection to the body 12 are proximate to one another, which configuration is common and known to those skilled in the art.

A locking linkage 38 spans the distance between the roll bell crank 32 of two adjacent roll suspension systems 18. The locking linkage 38 prevents or restricts movement of the roll bell cranks 32 of two adjacent roll suspension systems 18 in opposite directions, i.e., clockwise and counterclockwise. The locking linkage 38 acts to allow tandem movement of the roll bell cranks 32 of two adjacent roll suspension systems 18. This means that both roll bell cranks 32 may move either clockwise or counterclockwise simultaneously. It is this action of the locking linkage 38 that locks out the roll suspension 18 during dive and bump motion, as described herein. The locking linkage 38 may comprise a solid link, a hydraulic link or a cable. FIGS. 1-5 illustrate a solid locking linkage 38.

Figure 2:
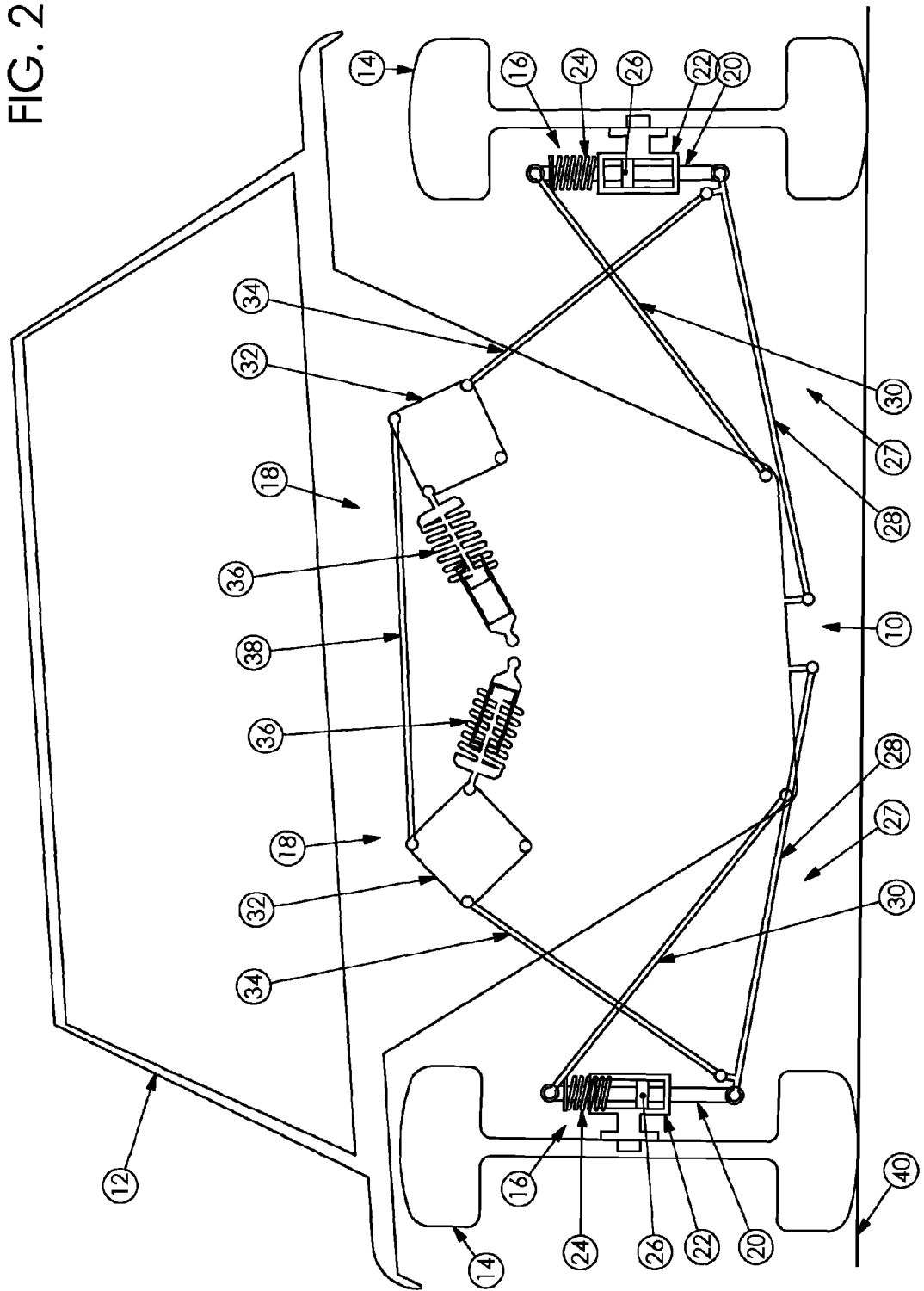
FIG. 2 illustrates the suspension of FIG. 1 at roll or during a turn.

FIG. 2 illustrates the operation of the a-arm to strut design of the inventive suspension 10 during roll or turning motion. In this instance, the vehicle is on an angled surface 40 such that the right wheel is higher than the left wheel. When a vehicle embodying the inventive suspension design 10 is on a surface 40 pitched at an angle the vehicle body 12 rolls downhill as would any other existing suspension. This rolling motion allows the wheels 14 to maintain a greater amount of contact with the surface 40 as the wheels 14 more closely align with the horizontal. Functionally the dive suspension assembly 26 of the higher wheel is forced upward while the dive suspension assembly 26 of the lower wheel is forced downward. In addition, the roll bell cranks 32 of the roll suspension 18 both rotate towards the upper wheel. The locking linkage 38 assures that both roll bell cranks 32 rotate in the same direction, close to the same amount, and at the same time. The roll dampeners 36 control how fast the roll bell cranks 32 pivot. The roll dampeners 36 may be adjusted to allow for roll suspension response during low speed motion due to body roll and resist high speed motion due to one wheel bump.

Figure 3:
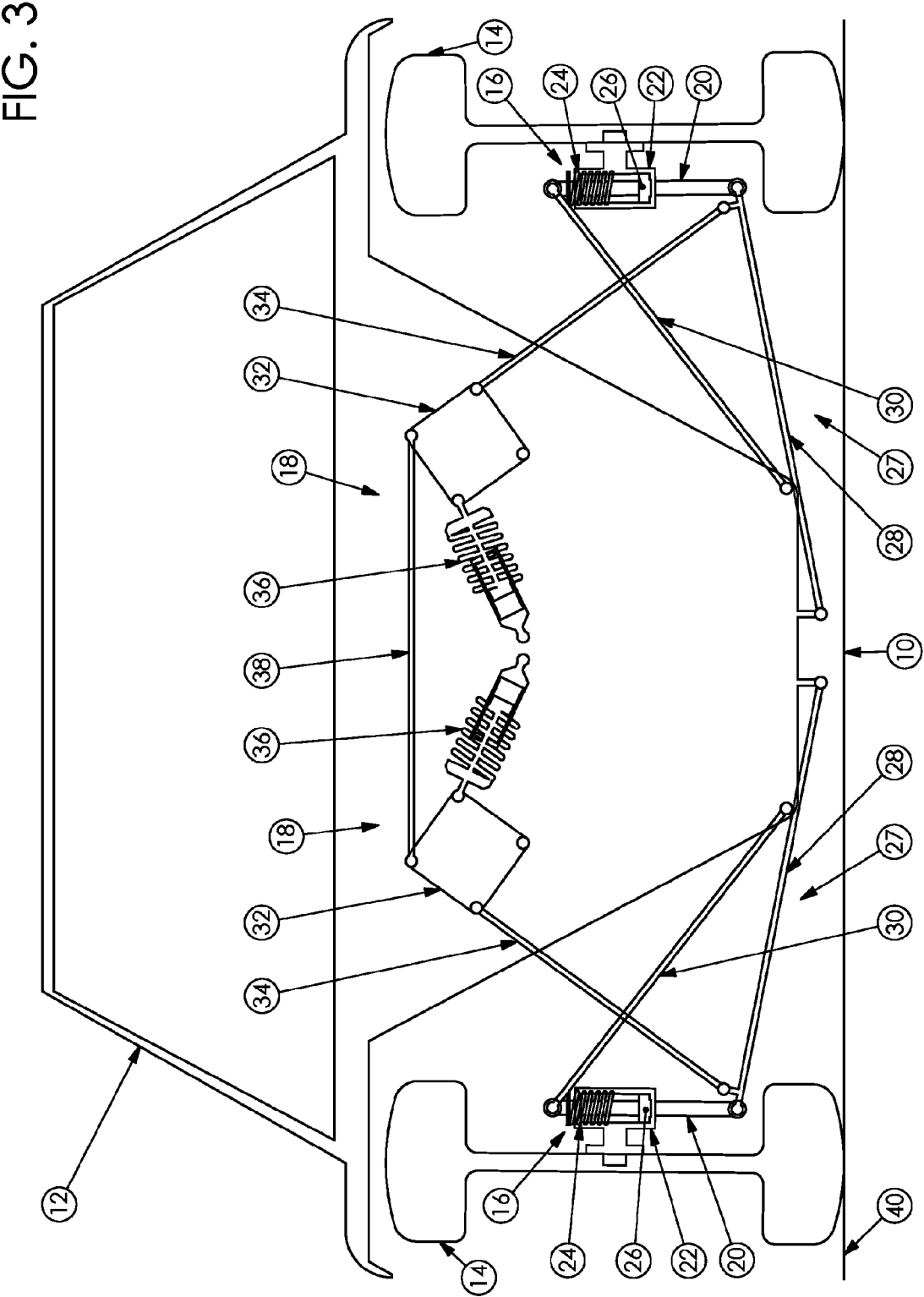
FIG. 3 illustrates the suspension of FIG. 1 at landing, dive, jounce or two-wheel bump.
Figure 4:
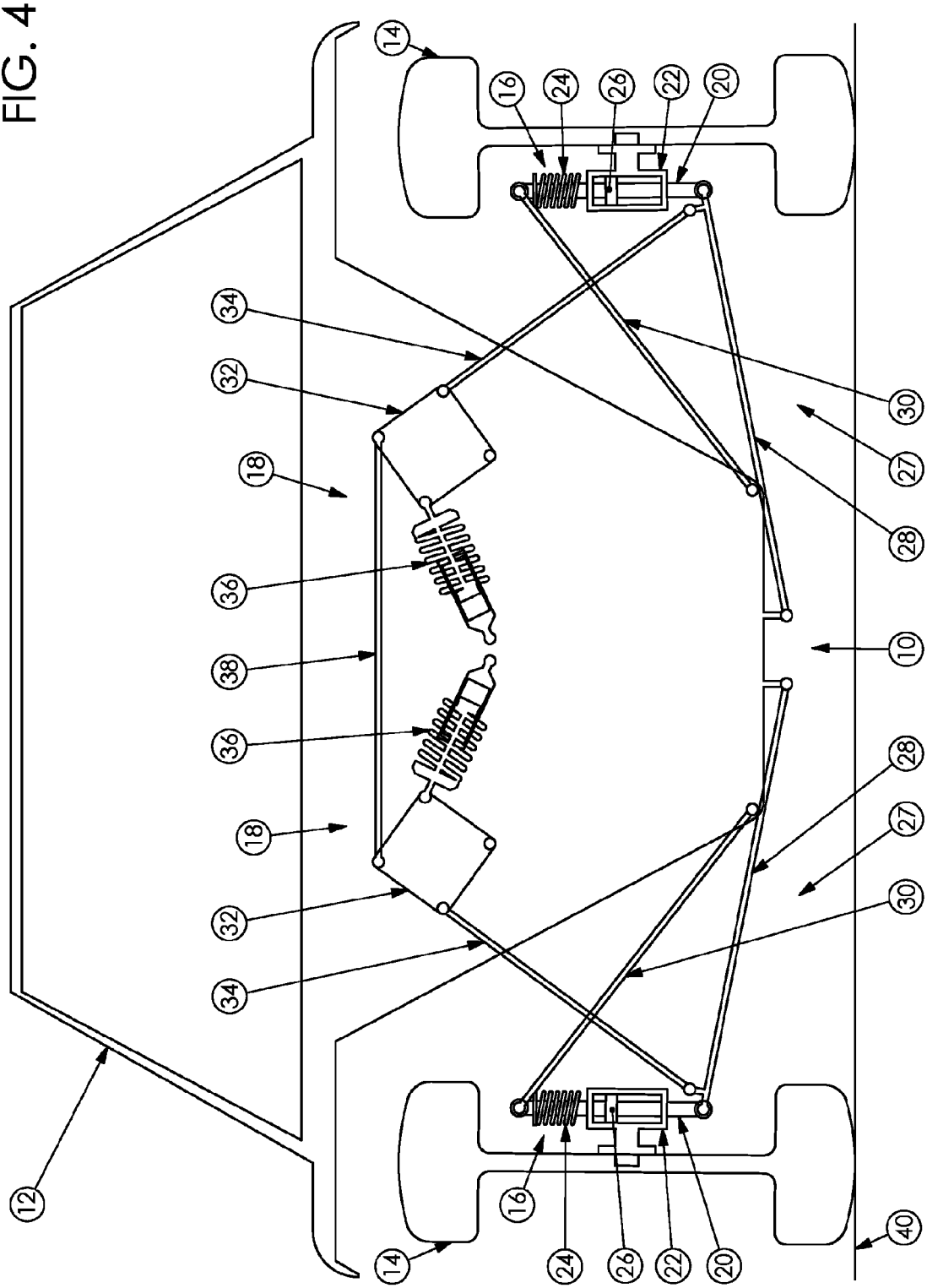
FIG. 4 illustrates the suspension of FIG. 1 at flight or droop.

FIG. 3 illustrates the function of the a-arm to strut design of the inventive suspension 10 during landing, dive, jounce or two-wheel bump motion. In this instance the locking linkage 38 locks out the roll suspension 18 entirely such that only the dive suspension 16 is responsive to the motion. Under dive motion, the dive suspension 16 forces both assemblies 26 downward when the wheels 14 experience a dive upwards. FIG. 4 illustrates the function of the same suspension design 10 during flight or droop motion. The dive suspension 16 provides support for the vehicle similar but opposite to dive motion. Without the locking linkage 38 the roll bell cranks 32 would experience opposite forces from the dive or flight motion causing them to move in opposite directions adding unnecessary motion to the vehicle body 12 and the wheels 14.

Figure 5:
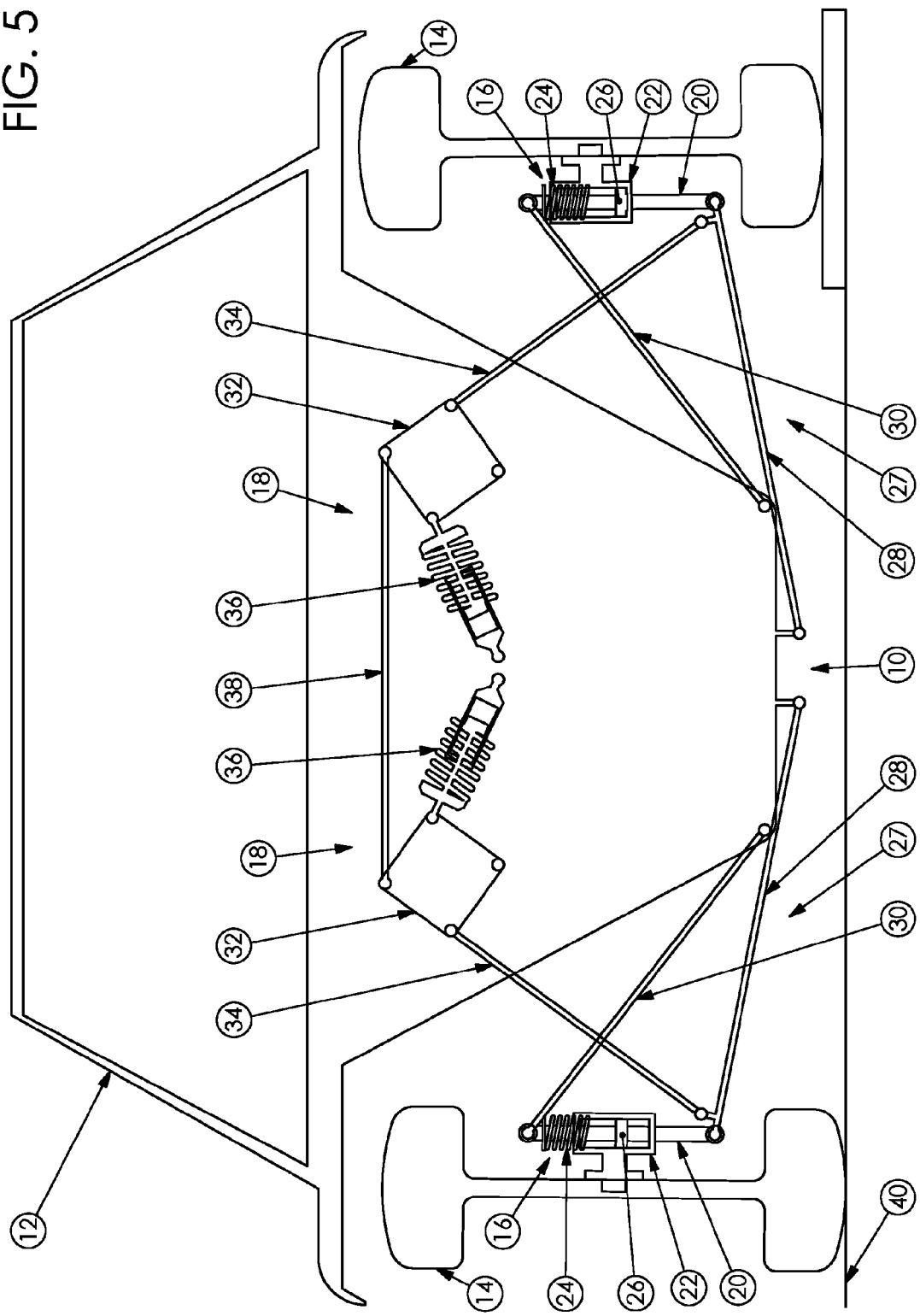
FIG. 5 illustrates the suspension of FIG. 1 at one-wheel bump.
Figure 6:
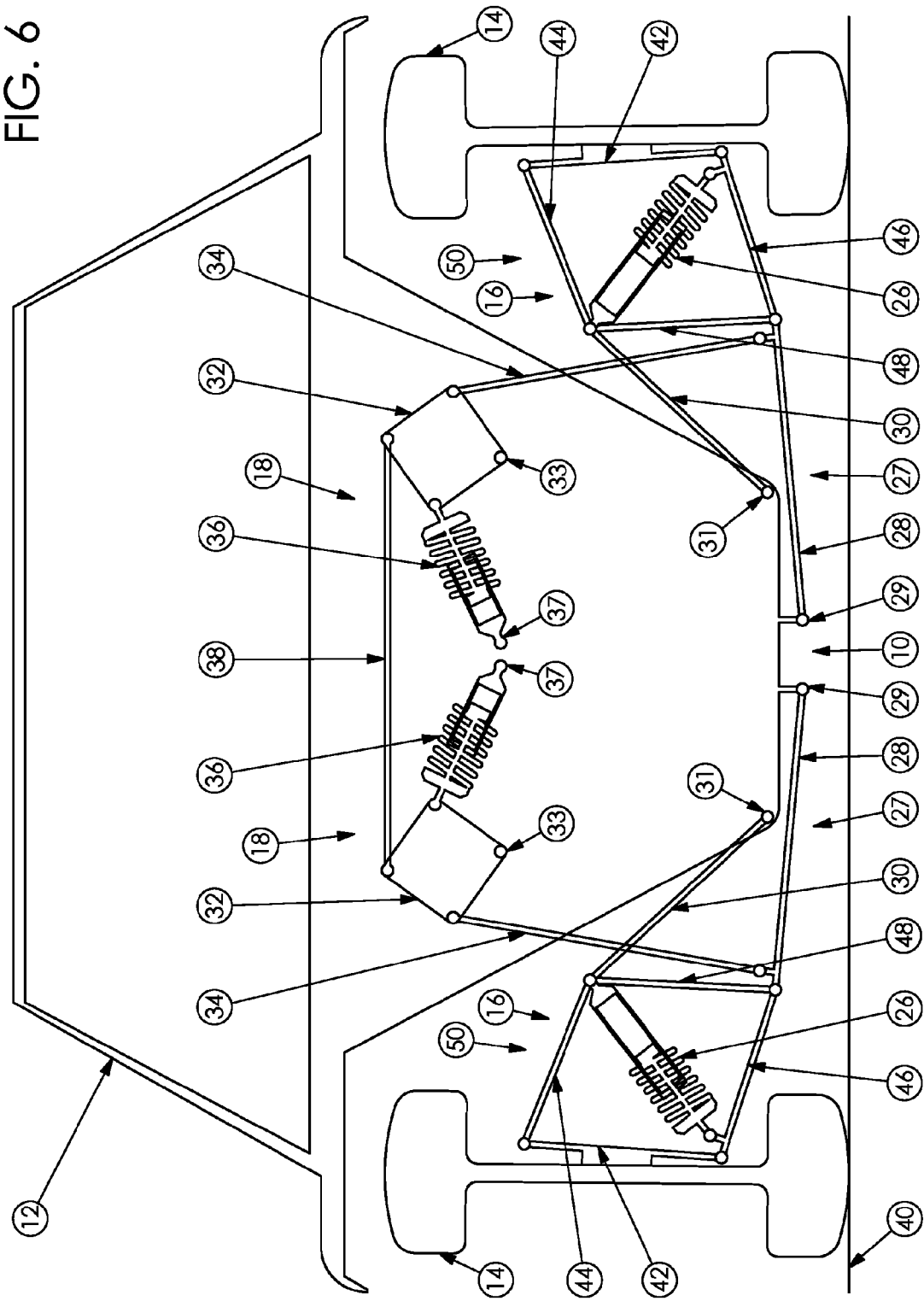
FIG. 6 illustrates an a-arm to a-arm design of the inventive suspension at ride height.

FIG. 5 illustrates the operation of the a-arm to strut design of the inventive suspension 10 when experiencing one-wheel bump motion. In the situation illustrated, the right wheel is bumped higher than the left wheel. In such a case, the assembly 26 of the dive suspension 16 in the right wheel is forced downward. The assembly 26 of the dive suspension in the left wheel will react to a lesser degree when under high speed bump motion since most of the bump energy that moves the right side is absorbed by the bump side dive dampener 22 and isolated/resisted by the roll dampers 36. Again, the locking linkage 38 forces the roll bell cranks 32 and the roll suspensions 18 to move in tandem such that the camber response is controlled. If the locking linkage 38 were omitted, then the roll bell crank 32 associated with the higher wheel would respond to a greater degree whereas the roll bell crank 32 of the roll suspension 18 associated with the lower wheel would respond in the opposite direction. Such responsiveness would introduce undesirable motion to the vehicle body 12 and the wheels 14.

A-Arm to A-Arm Design

FIGS. 6-10 illustrate an a-arm to a-arm embodiment of the suspension design 10 of the present invention. For the most part, this embodiment is configured and operates similarly to the a-arm to strut design. The difference resides primarily in the dive suspension 16.

In this a-arm to a-arm embodiment, the dive suspension 16 further comprises a dive upright 42 attached to the wheel 14. This connection between the dive upright 42 and the wheel 14 is rigid such that it does not pivot. An upper frame arm 44 is connected to the upper end of the dive upright 42. A lower frame arm 46 is connected to the lower end of the dive upright 42. A frame upright 48 is connected to ends of the upper and lower frame arms 44, 46 which are most distant from the dive upright 42. The configuration of the dive upright 42, upper and lower frame arms 44, 46 and frame upright 48 completes a frame assembly 50. This frame assembly 50 is preferably a trapezoid, a square or a rectangle depending on the relative lengths of the components. However, the frame assembly 50 may comprise any other shape as suits the vehicle on which the suspension 10 is mounted.

The assembly 26 of the dive suspension 16 is positioned in the frame assembly 50 so as to span from one corner to another corner. Specifically, a lower end of the assembly 26 is connected to the lower end of the dive upright 42. An upper end of the assembly 26 is connected to a distal end of the upper frame arm 44. In this instance, the upper control arm 30 is connected to the upper end of the frame upright 48. The lower control arm 28 and pushrod 34 are both connected to the lower end of the frame upright 48.

Figure 7:
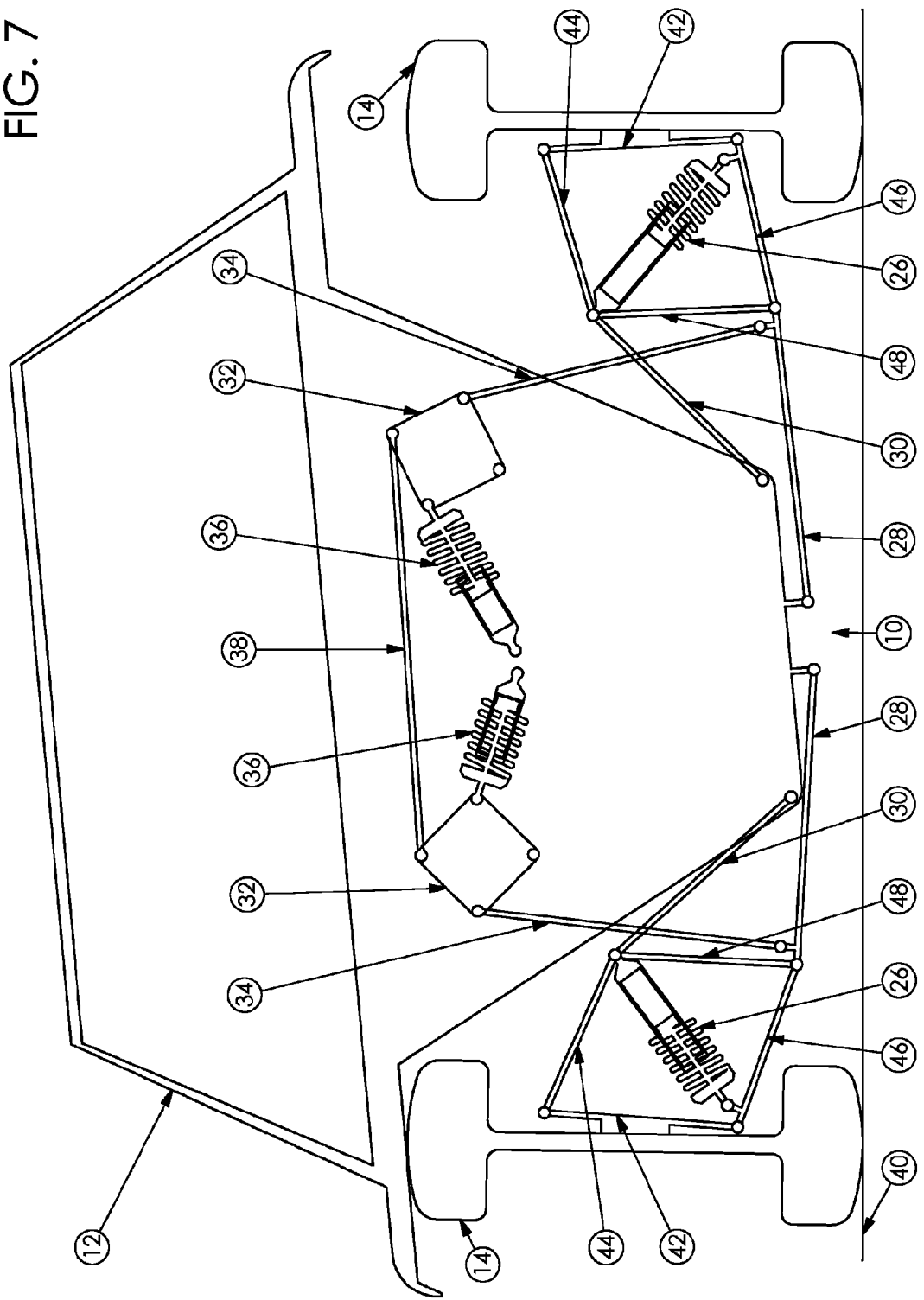
FIG. 7 illustrates the suspension of FIG. 6 at roll or turning.

FIG. 7 illustrates the action of the a-arm to a-arm design of the inventive suspension 10 when experiencing roll or turning motion, as on an angled surface. As with the a-arm to strut embodiment, the roll suspension 18 pivots toward the higher wheel such that the vehicle body 12 can roll downhill and realign the wheels with the vertical force of gravity. In addition the frame assembly 50 and assembly 26 associated with each dive suspension 16 pivots accordingly to allow each wheel to maximize the amount of the wheel in contact with the surface 40.

Figure 8:
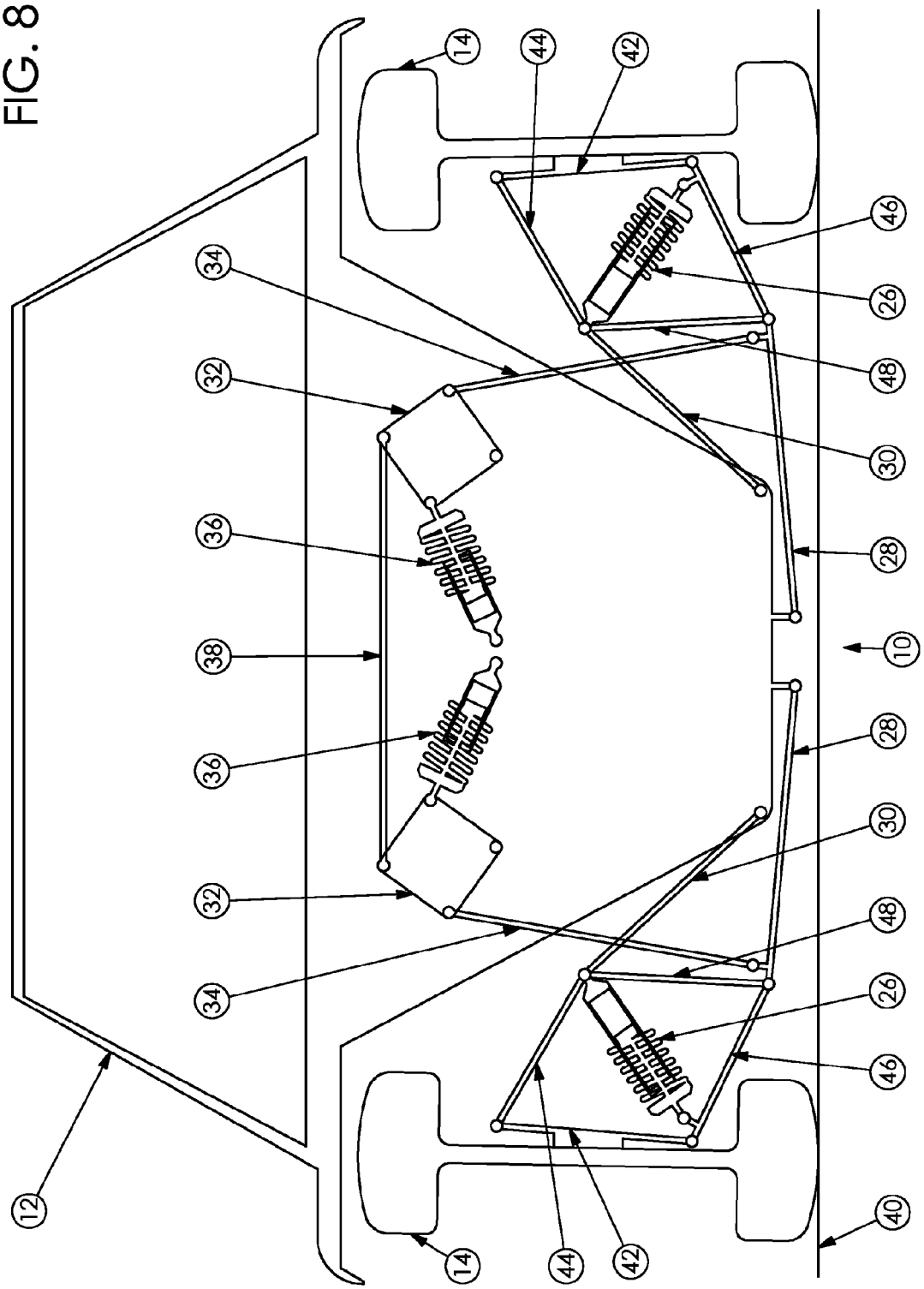
FIG. 8 illustrates the suspension of FIG. 6 at landing, dive, jounce or two-wheel bump.
Figure 9:
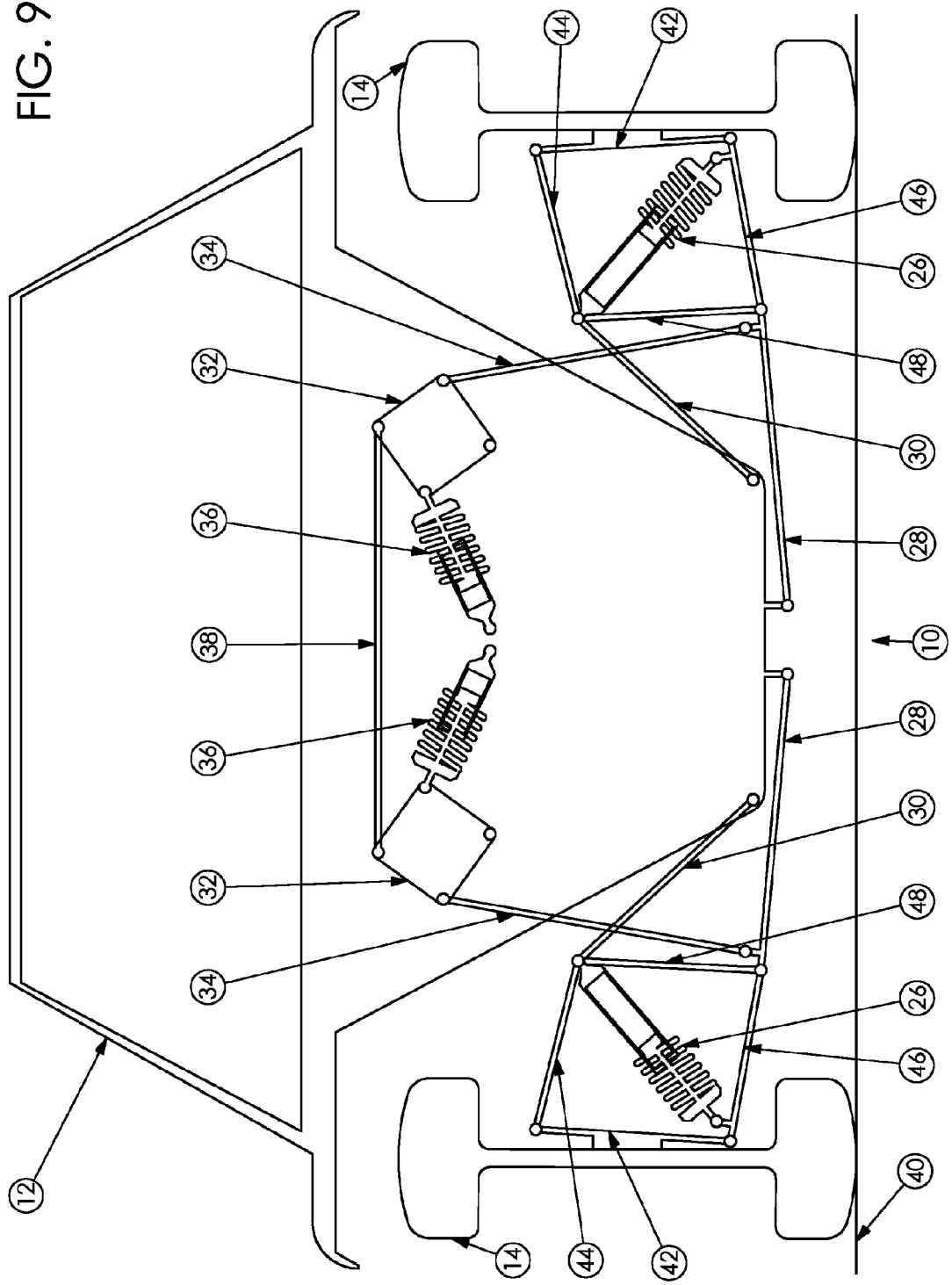
FIG. 9 illustrates the suspension of FIG. 6 at flight or droop.

FIG. 8 illustrates the operation of the a-arm to a-arm design of the inventive suspension 10 when experiencing landing, dive, jounce or two-wheel bump motion. As with the a-arm to strut embodiment the roll suspension 18 is locked out such that it is not responsive to dive motion. The frame assemblies 50 and assemblies 26 of the dive suspension 16 associated with each wheel 14 respond by pivoting in the opposite direction of the dive motion. This provides increased responsiveness to such motion. FIG. 9 illustrates operation of the a-arm to a-arm design of the inventive suspension 10 when experiencing flight or droop motion. The assemblies 26 and dive suspension 16 provides support for the vehicle similar but opposite to that experienced in dive motion. Without the locking linkage 38 the roll bell cranks 32 would experience opposite forces from the dive or flight motion causing them to move in opposite directions adding unnecessary motion to the vehicle body 12 and the wheels 14.

Figure 10:
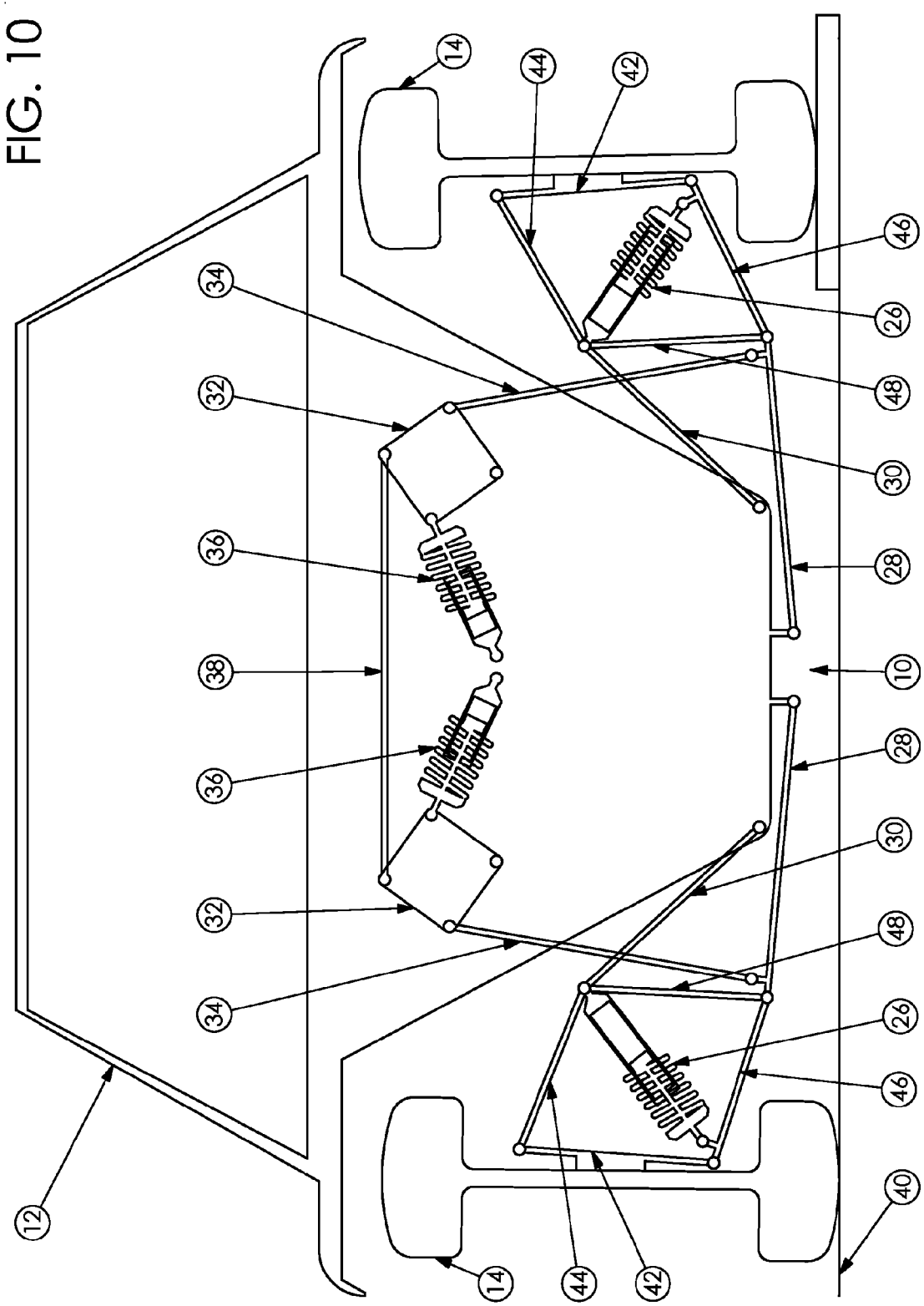
FIG. 10 illustrates the suspension of FIG. 6 at one-wheel bump.
Figure 11:
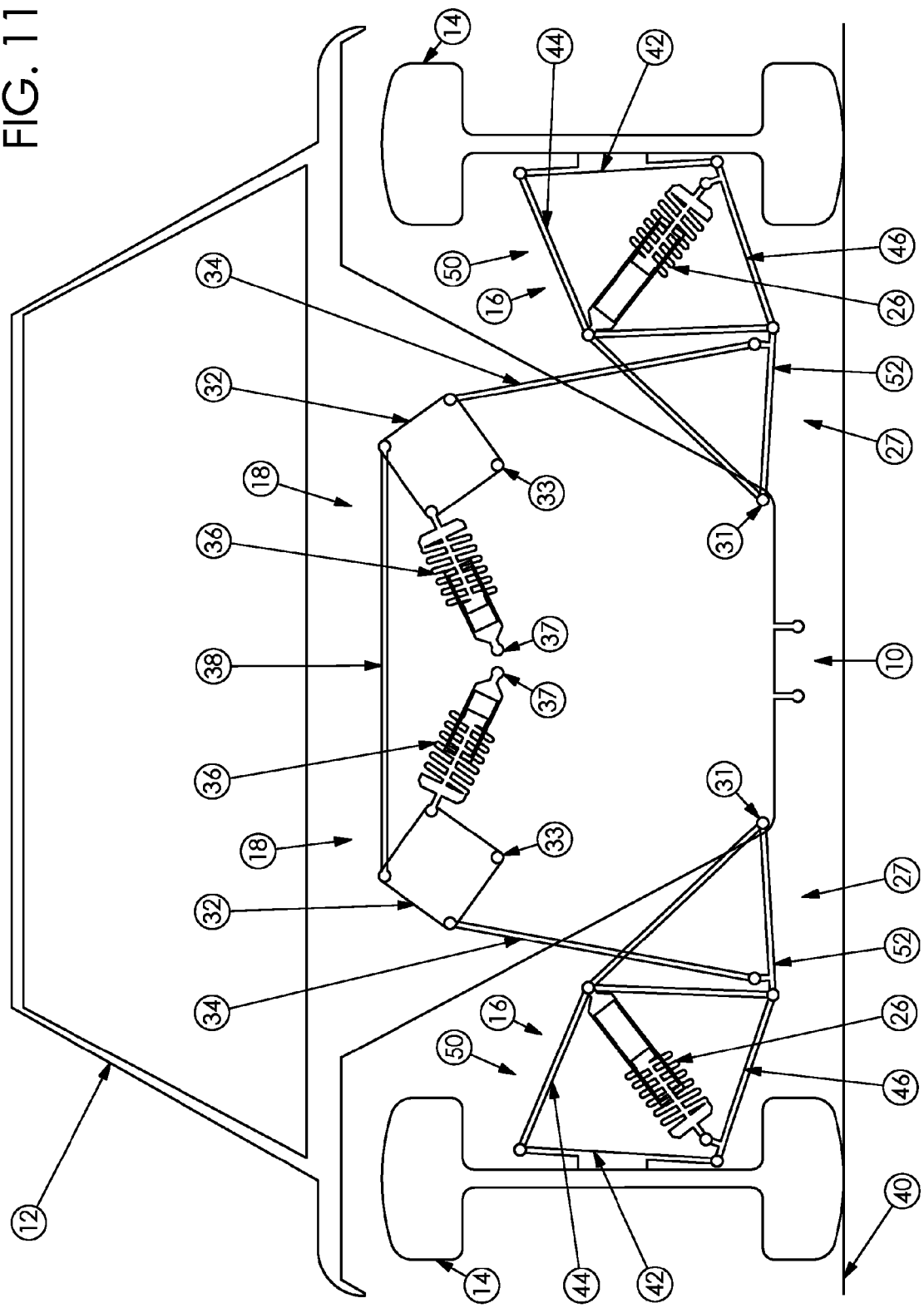
FIG. 11 illustrates a swing arm to a-arm design of the inventive suspension at ride height.

FIG. 10 illustrates operation of the a-arm to a-arm design of the inventive suspension 10 when experiencing one-wheel bump motion. As with the a-arm to strut embodiment, the locking linkage 38 forces the roll bell cranks 32 to move in tandem such that the camber response is controlled. The frame assembly 50 and assembly 26 of the dive suspension 16 again pivots in the opposite direction of the bump on the side that the bump occurs. The frame assembly 50 and assembly 26 on the dive suspension 16 on the side opposite from which the bump occurs will react to a lesser degree when experiencing a high speed bump since most of the bump energy that moves the opposite side is absorbed by the assembly 26 on the bump side and isolated by the roll dampeners 36.

Swing Arm to A-Arm Design

FIGS. 11-15 illustrate a swing arm to a-arm embodiment of the suspension design 10 of the present invention. For the most part this embodiment is configured and operates similarly to the a-arm to a-arm design. The difference resides primarily in the fact that the upper and lower control arms 28, 30 are replaced by a swing arm member 52.

In this embodiment, the suspension linkage 27 does not consist of upper and lower control arms 28, 30. A swing arm 52 links the lower portion 31 of the body 12 to upper and lower ends of the frame upright 48. In this configuration, the suspension linkage 27 allows for pivoting movement of the wheel 14 and assembly 26 around a single point 31 in contrast to the two points of rotation 29, 31 involved in the a-arm linkage.

Figure 12:
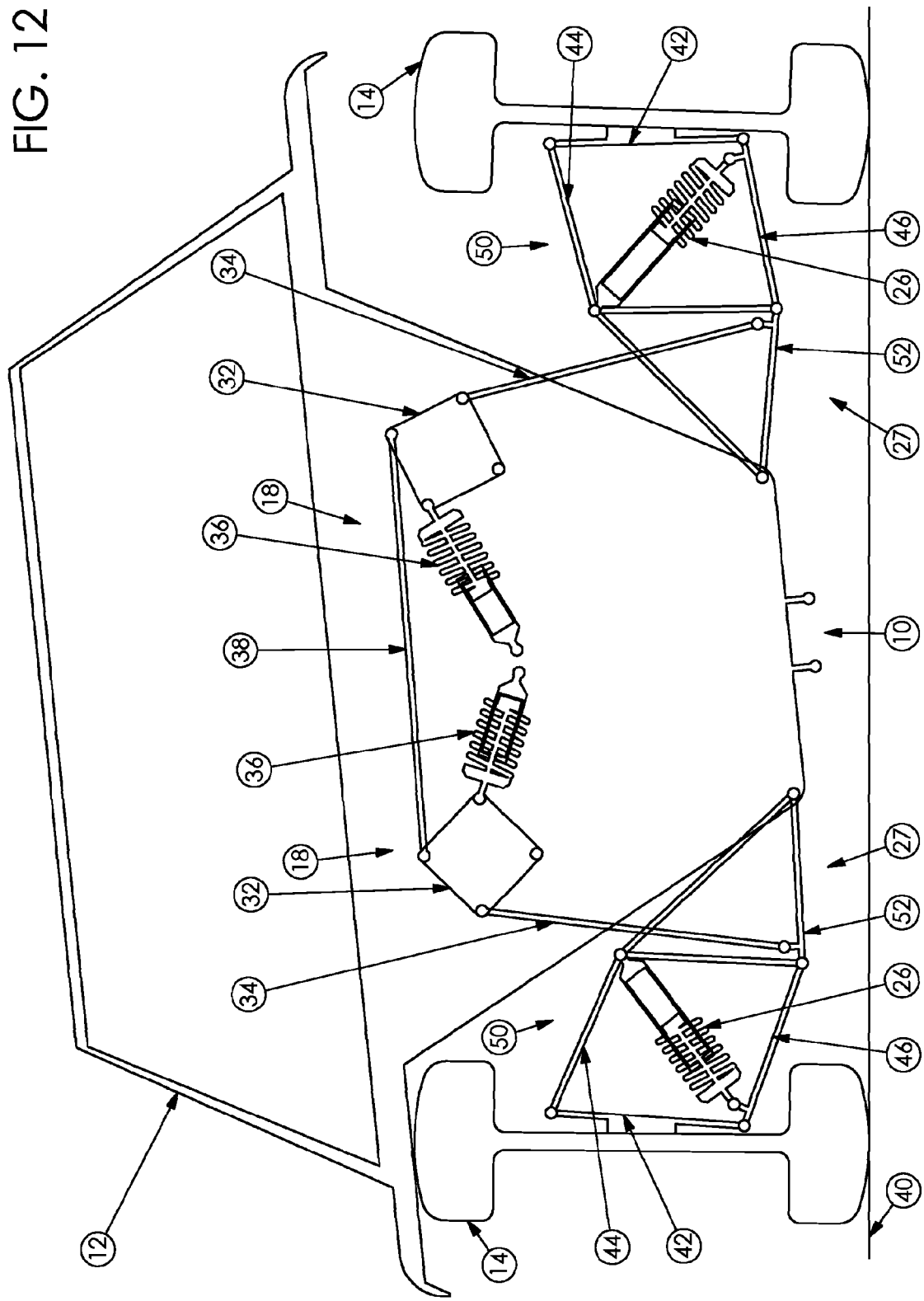
FIG. 12 illustrates the suspension of FIG. 11 at roll or turning.

FIG. 12 illustrates the action of the swing arm to a-arm design of the inventive suspension design 10 when experiencing roll or turning motion, as on an angled surface. As with the prior embodiments, the roll suspension 18 pivots toward the higher wheel such that the vehicle body 12 can roll downhill and realign the wheels with the vertical force of gravity. The frame assembly 50 and assembly 26 associated with each dive suspension 16 pivots accordingly to allow each wheel to maximize the amount of wheel in contact with the surface 40. The connection of the swing arm 52 to the body 12 provides a single pivot point for the body with respect to each dive suspension 16.

Figure 13:
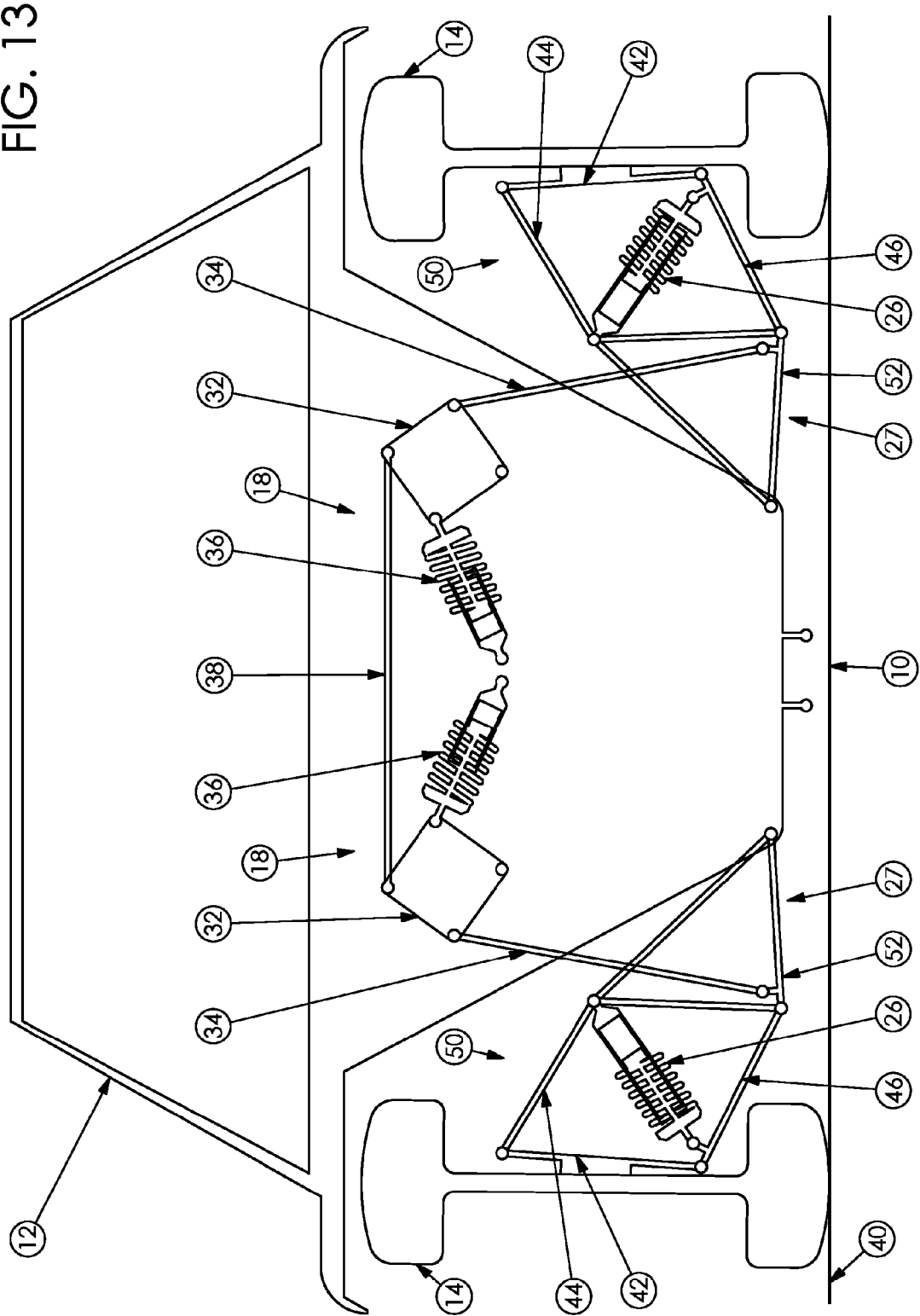
FIG. 13 illustrates the suspension of FIG. 11 at landing, dive, jounce or two-wheel bump.

FIG. 13 illustrates the operation of the swing arm to a-arm design of the inventive suspension 10 when experiencing landing, dive, jounce, or two-wheel bump motion. As with the prior embodiments, the roll suspension 18 is locked out such that it is not responsive to dive motion. The frame assemblies 50 and assemblies 26 of the dive suspensions 16 associated with each wheel 14 respond by pivoting in the opposite direction of the dive motion. The single point of connection 31 by the swing arm 52 again provides a single point about which the dive suspension 16 pivots with respect to the body 12. The function of the dive suspension 16 and swing arm 52 provides increased responsiveness to dive motion.

Figure 14:
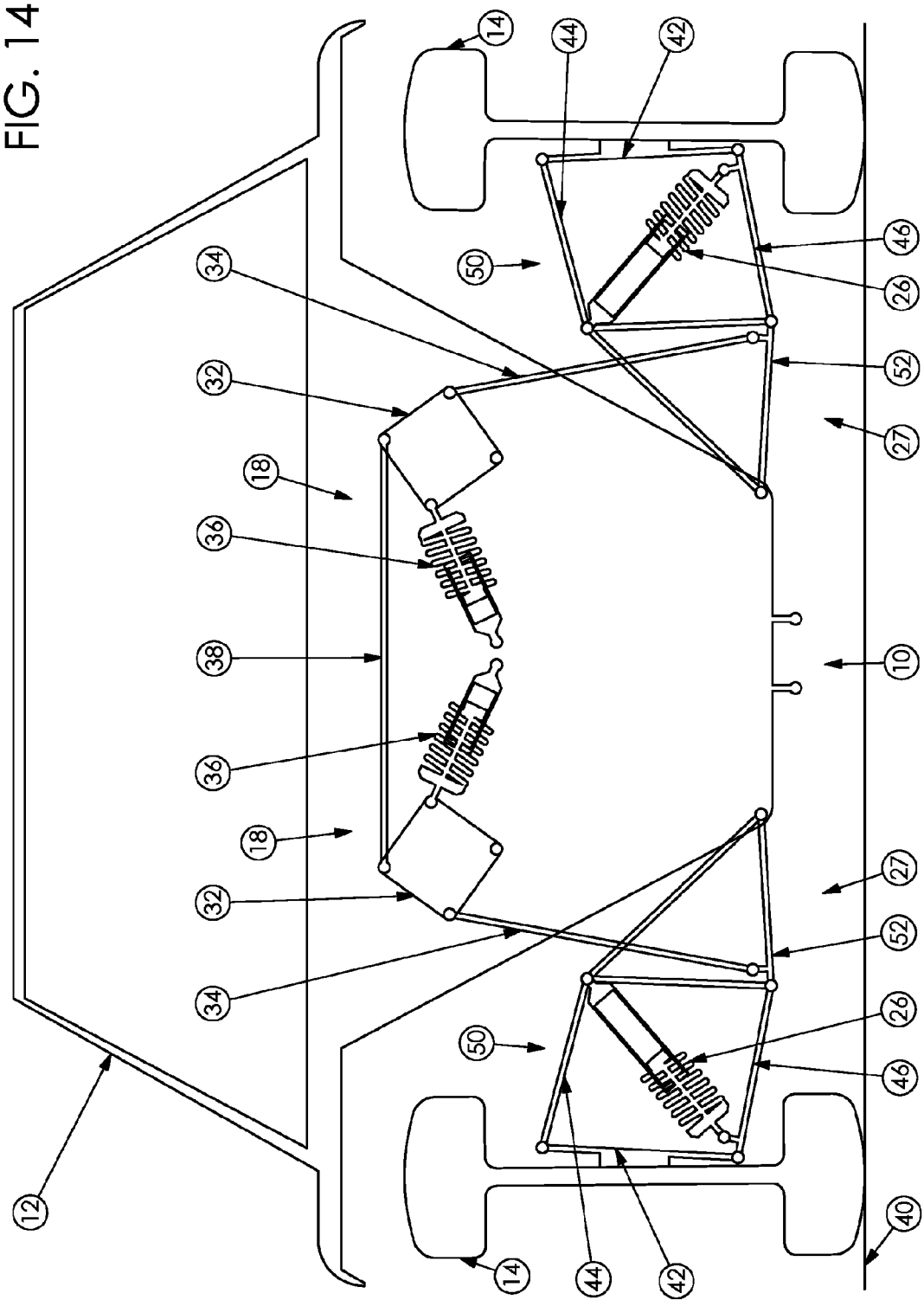
FIG. 14 illustrates the suspension of FIG. 11 at flight or droop.

FIG. 14 illustrates the function of the swing arm to a-arm design during flight or droop motion. The dive suspension 16 provides support for the vehicle similar but opposite to that support provided for dive motion. Without the locking linkage 38 the roll bell cranks 32 would experience opposite forces from the dive or flight motion causing them to move in opposite directions adding unnecessary motion to the vehicle body 12 and the wheels 14.

Figure 15:
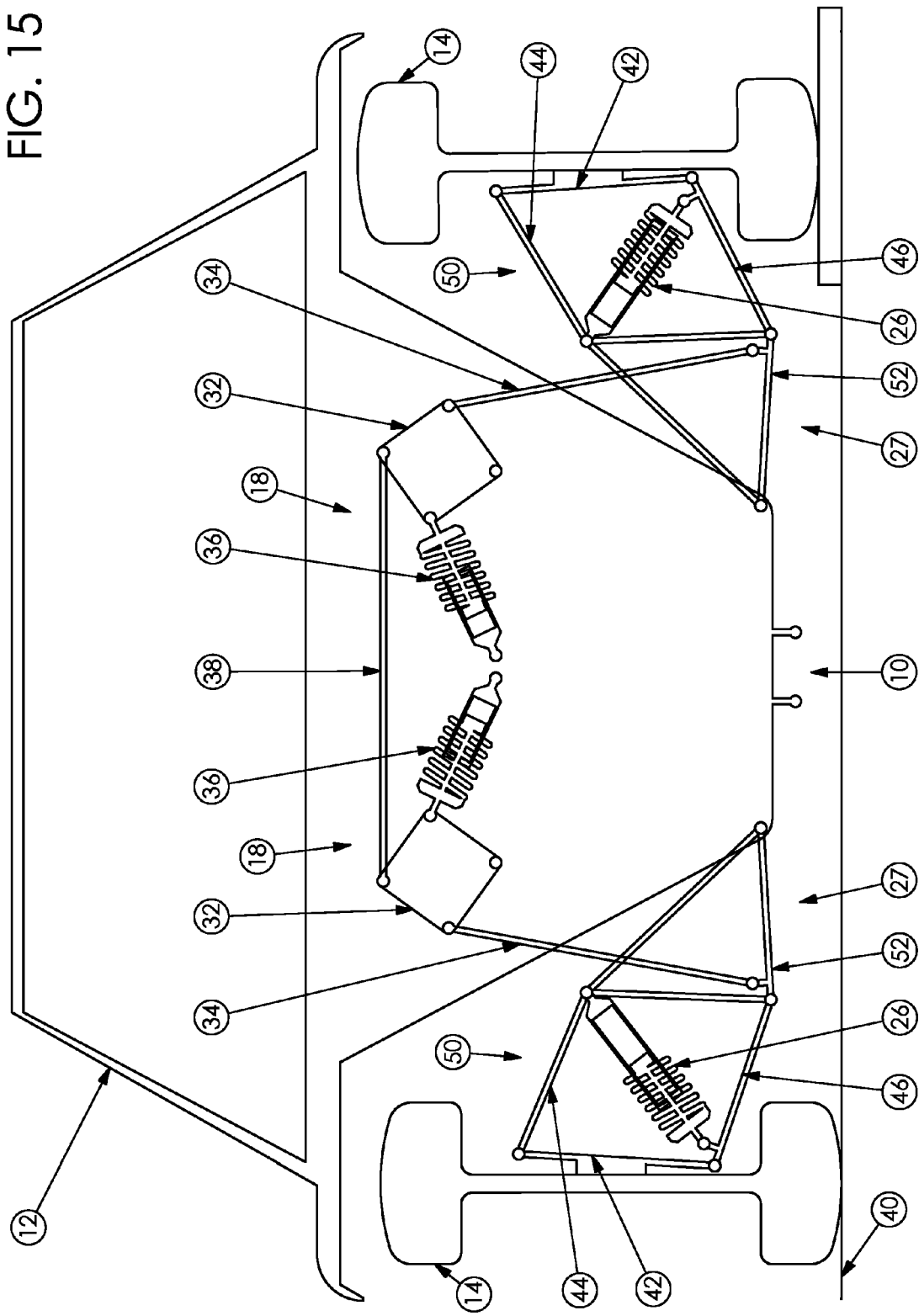
FIG. 15 illustrates the inventive suspension of FIG. 11 at one-wheel bump.
Figure 16:
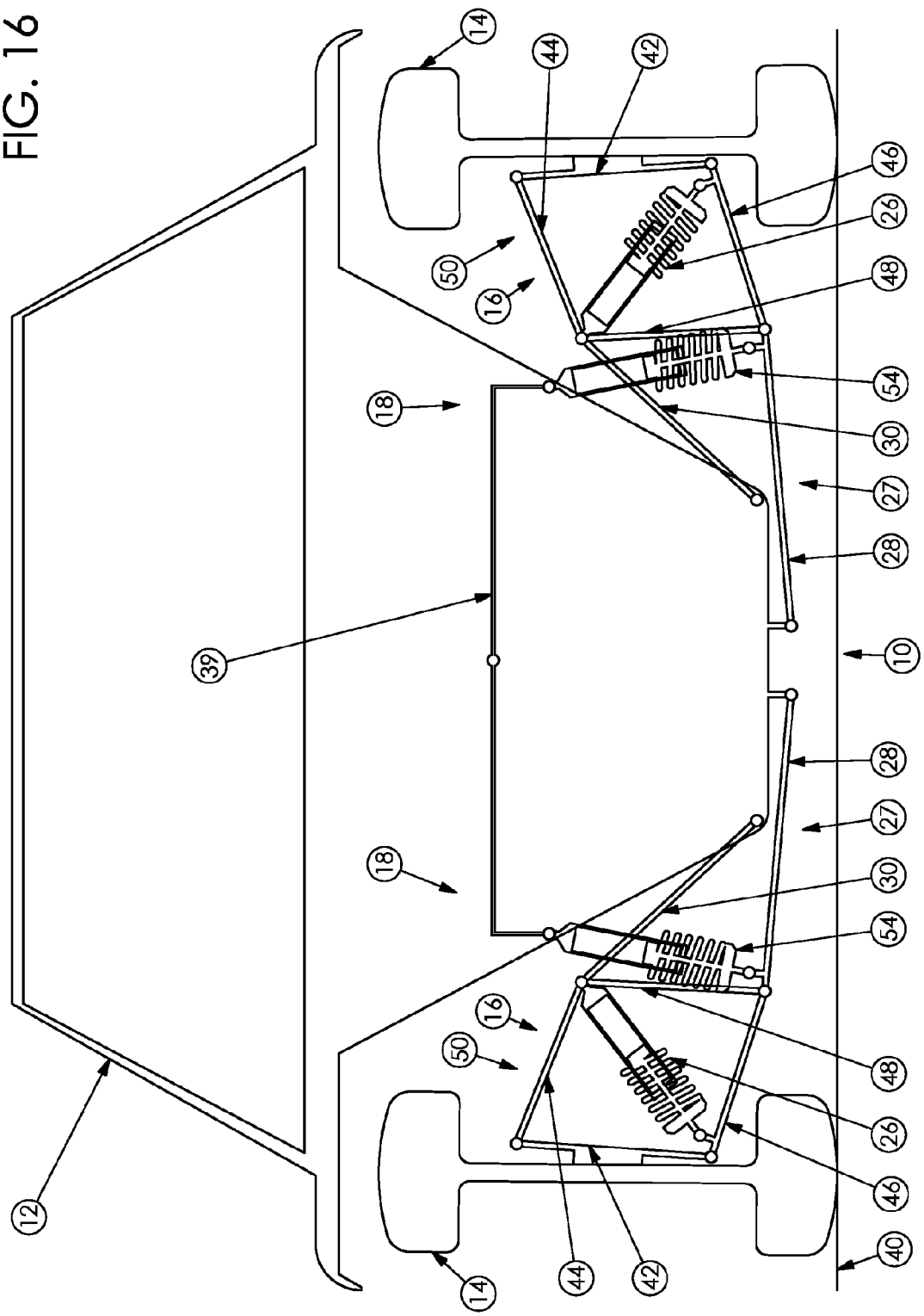
FIG. 16 illustrates an a-arm to a-arm design of the inventive suspension with a hydraulic locking linkage at ride height.

FIG. 15 illustrates operation of the swing arm to a-arm design of the inventive suspension design 10 experiencing one-wheel bump motion. As with the prior embodiments, the locking linkage 38 forces the roll bell cranks 32 to move in tandem such that the camber response is controlled. The frame assembly 50 and assembly 26 of the dive suspension 16 again pivots in the opposite direction of the bump on the side that the bump occurs. The frame assembly 50 and assembly 26 on the dive suspension 16 on the side opposite from which the bump occurs will react to a lesser degree when experiencing a high-speed bump, since most of the bump energy that moves the opposite side is absorbed by the assembly 26 on the bump side and isolated by the roll dampeners 36.

A-Arm to A-Arm Design with Hydraulic Locking Linkage

FIGS. 16-20 illustrate another embodiment of the suspension design 10 of the present invention. The design illustrated in FIGS. 16-20 is most similar to the design depicted in FIGS. 6-10 employing an a-arm to a-arm linkage. The difference resides in that the roll bell crank 32, push rod 34 and roll dampener 36 of the roll suspension 18 are replaced by a hydraulic link shock 54. The hydraulic link shock 54 is similar to the assembly 26 of the dive suspension 16. The hydraulic link shock 54 is attached at a lower end adjacent to the lower end of the frame upright 48. The upper end of the hydraulic link shock 54 is attached at its upper end to the body 12. Hydraulic link shocks 54 is associated with each wheel 14 on opposite sides of the body 12 connected by a locking linkage 39.

The locking linkage 39 comprises a hydraulic connection between the pair of hydraulic link shocks 54. The hydraulic locking linkage 39 places each hydraulic link shock 54 in fluid communication with the other hydraulic link shock 54. In this configuration one hydraulic link shock 54 cannot collapse without the other hydraulic link shock 54 extending. This limitation again results in a situation where the roll suspension 18 is locked out during dive or flight motion by assuring that the hydraulic link shocks 54 never move in the same direction, i.e., both extending or both collapsing. As with the locking linkage 38 in the prior embodiments, the hydraulic locking linkage 39 prevents or restricts operation of the hydraulic link shocks 54 to opposite directions, i.e., extending/collapsing or collapsing/extending. The action of the hydraulic locking linkage 39 may be adjustable such that the degree to which the roll suspension 18 responds to roll and one wheel bump may be adjusted.

Figure 17:
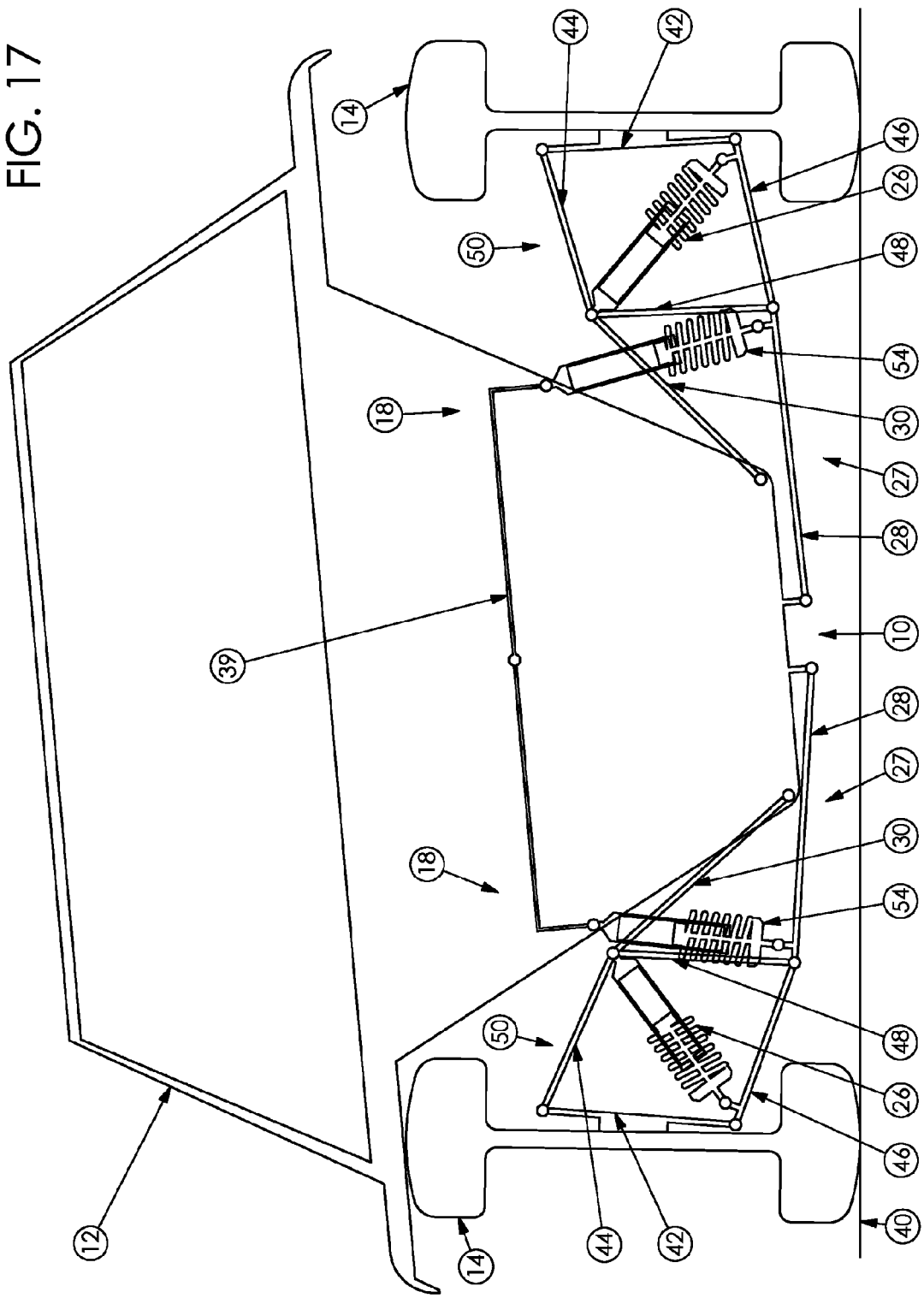
FIG. 17 illustrates the suspension of FIG. 16 at roll or turning.
Figure 18:
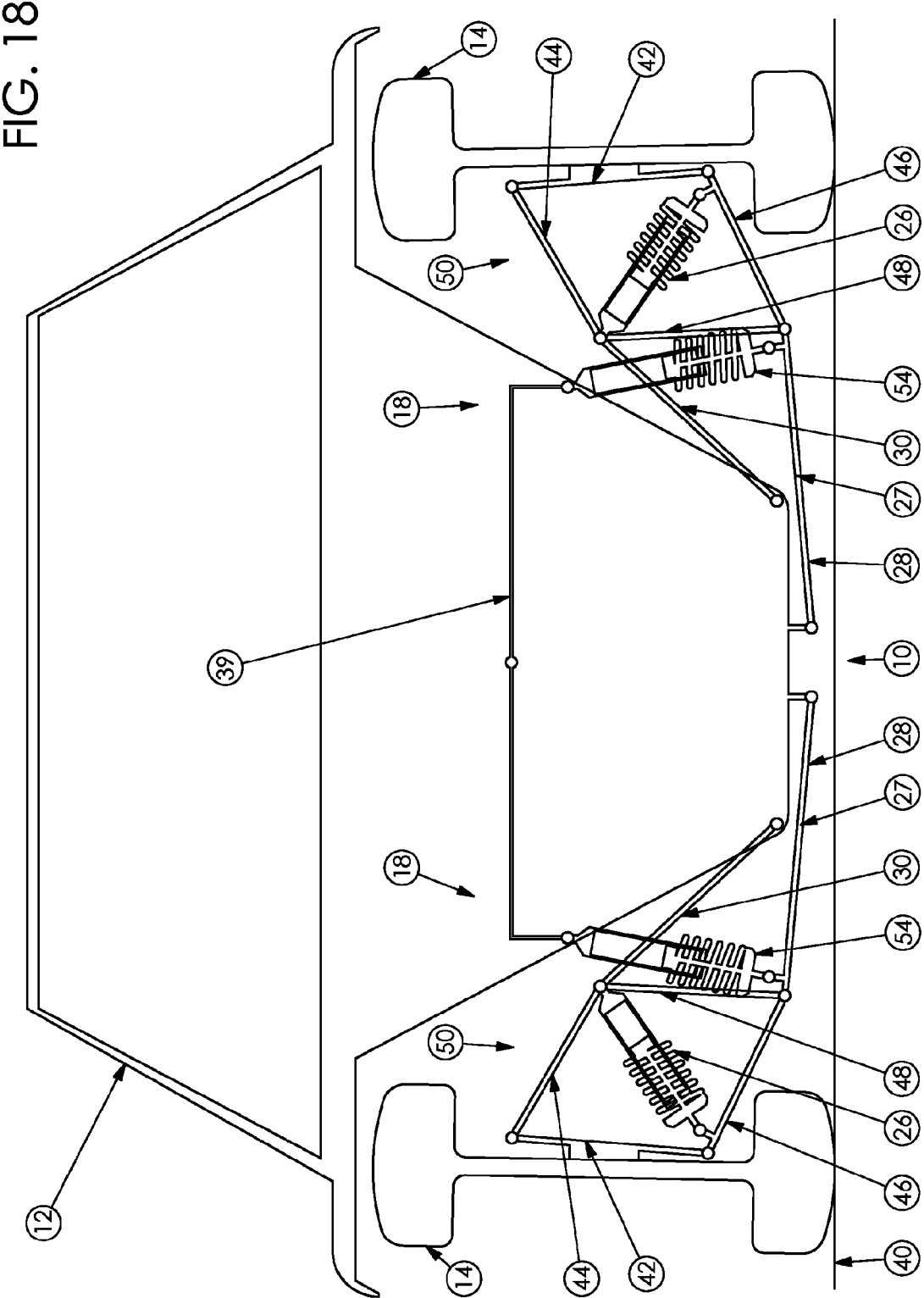
FIG. 18 illustrates the suspension of FIG. 16 at landing, dive, jounce or two-wheel bump.
Figure 19:
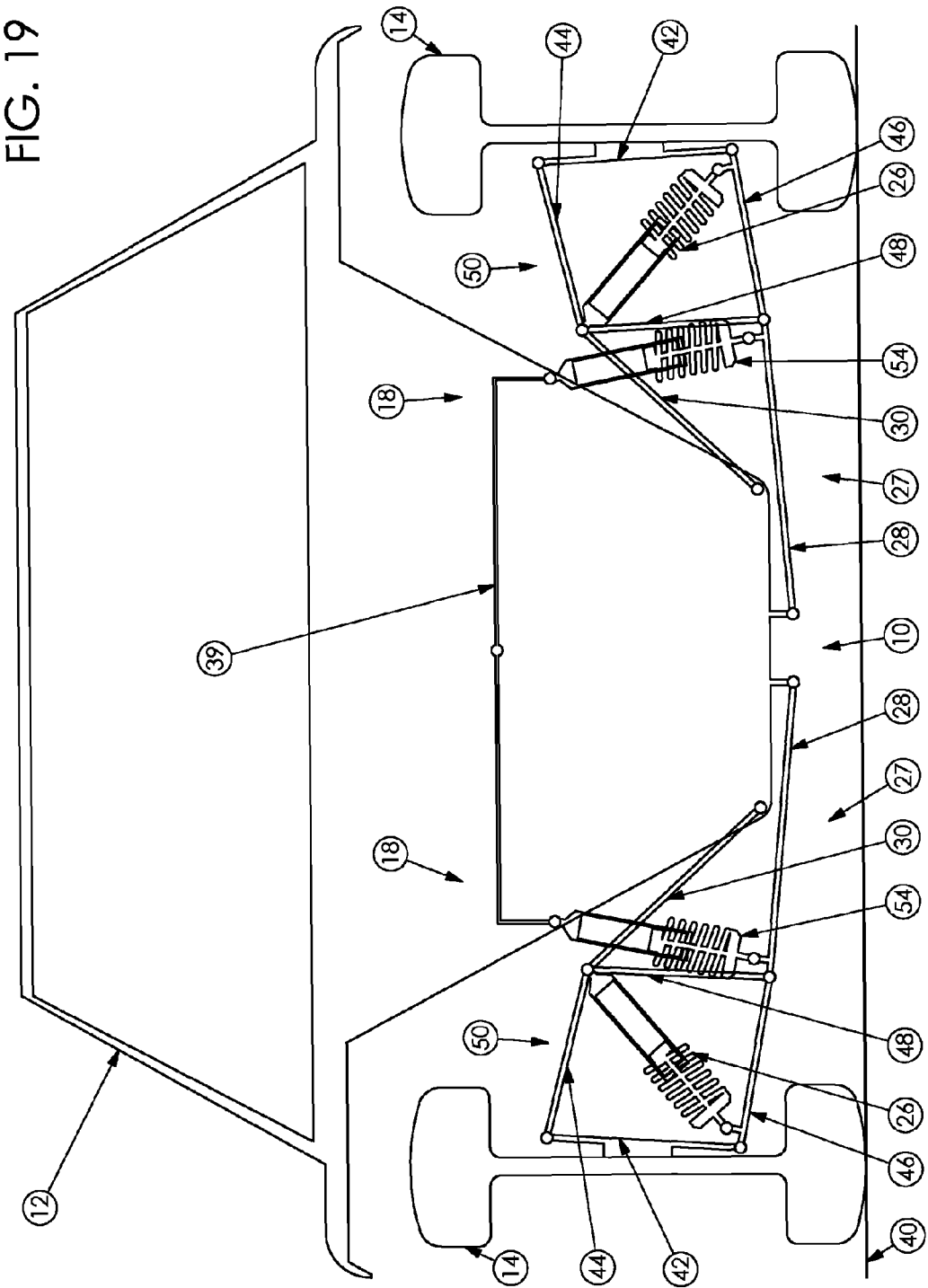
FIG. 19 illustrates the suspension of FIG. 16 at flight or droop.
Figure 20:
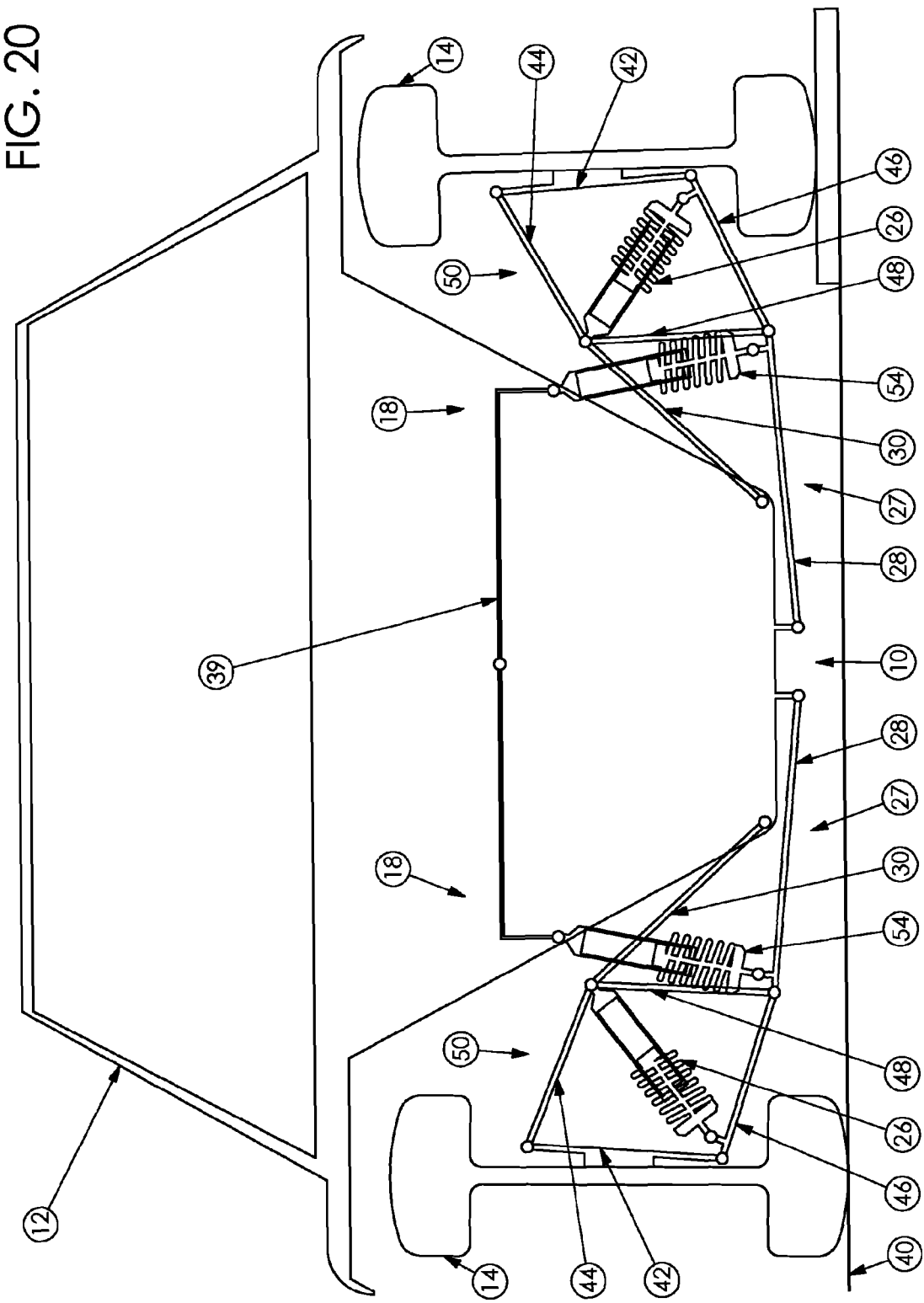
FIG. 20 illustrates the suspension of FIG. 16 at one-wheel bump.

FIG. 17 illustrates action of the a-arm to a-arm design with hydraulic locking linkage design of the inventive suspension 10 when experiencing roll or turning motion, as on an angled surface. As with the prior embodiments, the roll suspension 18 pivots toward the higher wheel such that the vehicle body 12 can roll downhill and realign the wheels with the vertical force of gravity. FIG. 18 illustrates the operation of the a-arm to a-arm design with hydraulic locking linkage of the inventive suspension 10 when experiencing landing, dive, jounce or two-wheel bump motion. As with the prior embodiments, the roll suspension 18 is locked out such that it is not responsive to dive motion. FIG. 19 illustrates operation of the a-arm to a-arm design with hydraulic locking linkage of the inventive suspension 10 experiencing flight or droop motion. As with the prior embodiments, the response is similar but opposite to that of the system when experiencing dive motion. The roll suspension 18 is again locked out during flight motion. FIG. 20 illustrates operation of the a-arm to a-arm design with hydraulic locking linkage of the inventive suspension 10 when experiencing one-wheel bump motion. As with the prior embodiments, the hydraulic locking linkage 39 forces the hydraulic link shocks 54 to move in opposite directions such that the camber response is controlled.

The inventive suspensions 10 can be active, semi-active or passive suspensions differentiating between vertical and lateral loading scenarios and responding accordingly. Inventive suspensions 10 respond differently to a one-wheel bump than it does to body roll, even as a passive suspension. Inventive suspensions 10 further respond differently to a two-wheel bump (dive) than they do to body roll, even as a passive suspension. The camber change response of the inventive suspension 10 at roll and at one-wheel bump are functions of both the kinematics and the kinetics of the combined dive and roll suspension 16, 18 designs. In other words the camber rates/curves depend on the spring rates, dampening rates and swaybar rates that are used as well as the kinematic camber curves and roll centers of the suspension designs. Inventive suspensions 10 must be designed by balancing the kinematics and kinetics of both suspensions systems with each other.

A Camber Factor and related terminology is defined to relate the suspension systems to each other and to the resultant camber curves. Although the inventive suspension systems appear to have multiple roll centers due to multiple suspension designs, overall there is only one resultant roll center. Based on design, an inventive suspension 10 can be made to keep the wheel 14 at a fixed angle to the ground 40 at dive and roll or any combination of the two. Alternatively, the inventive design can actually camber inner and/or outer wheels 14 into or out of the turn with respect to the ground 40.

The locking linkages 38, 39 separate vertical loading scenarios from lateral loading scenarios. When the vehicle is on level ground, based on gravity's pull from the vehicles' center of gravity, the inventive suspension system passively identifies the vertical loads and responds accordingly. The locking linkages 38, 39 are positioned such that vertical forces, i.e., gravity and other forces parallel thereto, acting from the left and right wheels are balanced with each other when the vehicle is on level ground 40. When the vehicle is on non-level ground 40, the suspension loads perpendicular to the ground 40 are balanced and the vehicle body 12 is rolled with respect to the ground 40 to a new equilibrium position just like any other vehicle that is suspended with an existing suspension design. The locking linkages 38, 39 are set up such that at the same time they allow the lateral loads to move the suspension without interference. The locking linkages 38, 39 affect only one of the suspension systems, the roll suspension 18. During dive/jounce/flight or two-wheel bump motion the roll suspension 18 doesn't move allowing the dive suspension 16 to function as the only functioning suspension on the vehicle. In contrast, during roll motion both the roll and dive suspensions 18, 16 function simultaneously. At one-wheel bump, both suspensions also function simultaneously.

The dive suspension 16 is designed to have no (or minimum) camber change during dive and bump, while it losses wheel camber that is equal (or close) to the body roll angle during roll. The roll suspension 18 is set for extreme camber recovery and it can recover the camber lost due to the roll of the dive suspension 16 as well as the tire deflection and even more to optimize the tire contact patch under heavy lateral loading. Since the roll suspension 18 doesn't work at dive the negative effects of the extreme roll recovery is not seen at dive.

The roll suspension 18 dampening rates can be separately tuned for high and low speed. Thus the roll suspension 18 resists the high speed one-wheel bump scenario movement further with its dampening values allowing the dive suspension 16, specifically the part of the dive suspension 16 that is subject to the one-wheel bump, to absorb most of the bump. There will also be reaction to the high speed bump on the other side that is not subject to the bump. This reaction is minimum compared to the bump side, since most of the bump energy that moves the opposite side is absorbed by bump side dampener 22, 26 and isolated/resisted by the roll dampers 36. Low speed one-wheel bumps can travel through both suspensions 16, 18 and result in combined camber control, since the low speed one-wheel bumps allow enough time for the body roll to react, the vehicle body 12 rolls away from the bump due to its shifted center of gravity, thus making the suspension respond as if it is on non-level ground.

The inventive suspensions 10 can have much stiffer spring rates for dive suspensions 16 minimizing the deflection due to acceleration or down force due to aero dynamics of the suspension and still have compliant roll rates allowing better weight distribution over road irregularities. This is commonly achieved with a third shock system on existing race cars. Inventive suspensions 10 provide this benefit without any add on modifications since it already has separate spring and dampening rates for dive and roll suspensions 16, 18.

Inventive suspensions 10 allow aero packages producing down forces to be mounted in between the two suspension systems. Specifically on top of the dive suspension 16 but under the roll suspension 18, such that the down force only pushes on the dive suspension 16 and not the roll suspension 18. In the strut to a-arm design, the aero packages would be attached to strut 20. In the a-arm to a-arm design the aero package would be attached to frame upright 48. This means that the aero package would not be on the unsprung mass as it will be sprung over the dive suspension 16. With stiffer dive suspensions 16 the aero package would not change its position much with respect to the ground, while softer roll suspensions allow for the body 12 to roll as needed to provide a compliant suspension with better weight distribution without the disadvantages of loosing desired aero package position. Thus the inventive suspension 10 can also be used to separate the down force package from the roll effects of the sprung mass.

The inventive suspensions 10 can be tuned for their camber recovery ratios by changing their dampening rates, spring rates and swaybars or any combination thereof. The dampening rates are very easy to adjust thus providing very rapid camber rate adjustment. When used with an in cockpit adjustable shock on either or both suspensions 16, 18, the driver is able to change the camber rates on the go with a push of a button. When used with an active dampening control system the same shock can provide on the go camber rate change by simply changing the dampening rate, a significantly cheaper and safer option compared to prior art camber controlling active suspensions.

The inventive suspensions 10 can be tuned and designed to provide much better tire control and even tire wear on cars that can't corner any faster due to their roll over limit. Vehicles that have a high ratio of center of gravity height-to-track width will benefit from better, longer tire wear, while most sports cars will benefit both in performance and tire life. The inventive suspension 10 also allow for a lighter unsprung assembly design at the wheel, improving the ability of the wheel to follow the irregularities on the road.

Although there are kinematics diagrams and formulas that define the roll center for existing suspension systems based on the suspension geometry only, these roll centers are not necessarily the actual points to which the body/frame 12 is rolling with respect to the ground 40. The sprung mass is also going through vertical displacement due to jacking forces. The exact value of the displacement that is due to jacking forces depends on the wheel rate of the vehicle.

The real roll center about which the body is rolling with respect to the ground is based, in part, on the combination of the two motions (roll around the geometric roll center and translation due to jacking) as well as many other factors and is different from the geometric/kinematics roll center. For most existing suspensions designs the actual point a vehicle is rolling about cannot be located solely by kinematics/geometry. The ratio of the roll rate to the wheel rate will decide how much the car will displace vertically due to jacking forces per degree of body roll. Thus some error is introduced on the apparent roll center location by simplifying the system to a single degree of freedom. On the other hand the geometric roll center from kinematics analysis still accurately allows us to calculate body/frame roll angle for a given lateral load. Thus it is used to calculate the roll rate on the suspension systems.

In general, using the roll center for a roll point to calculate the roll moment (the vertical distance between the center of gravity and the kinematic roll center multiplied by the cornering force) and then separately calculating the jacking forces acting from the outer tire ground pivot point to the roll center, is a common vehicle suspension design and analysis method. The same simplifications can be made to analyze the inventive suspension system with relatively accurate results.

Methods such as FAP (Force Application Point) can be used with computer simulations to be more accurate. Such methods would be a better way of analyzing the inventive suspensions. The use of computer programs to simulate, analyze and iterate the design minimizes the assumptions and can include all degrees of freedom. However, a simplified approach will be used in this disclosure. The simplified model of the inventive suspension 10 has a pivot joint on the outer wheel. When the jacking force effects are separated, the system is further simplified to a single degree of freedom that pivots at the effective roll center.

Since there is no prior analytic method and terminology associated with the inventive suspensions, it is necessary to establish certain definitions and equations that allow for analytical calculations. Below are these definitions and equations.

DIVE SUSPENSION=A suspension design that has good camber control at dive and bump and bad camber control (camber losing) at roll.
ROLL SUSPENSION=A suspension design that has good camber control (camber recovering) at roll and bad camber control at dive and bump
TIRE SUSPENSION=Tire as a suspension
CG=Center of Gravity.

LGs=Desired/Max Lateral Gs the vehicle can handle/ Limited by CG height/track ratio.

CAMBER RATE=(CAMBER CHANGE AT WHEEL/BODY ROLL)×ROLL RATE. CAMBER RATE is with respect to the ground. Units for CAMBER RATE are, DEGREES/Gs

R1=Roll rate for DIVE SUSPENSION
R2=Roll rate for ROLL SUSPENSION
RT=Roll rate for TIRE SUSPENSION RR=Resultant roll rate. RR=$R1+R2+RT$.

RC1=Roll center for DIVE SUSPENSION only.
RC2=Roll center for ROLL SUSPENSION only
RCT=Roll center for TIRE SUSPENSION only (estimated on ground, center of track).
RC=Roll center for DIVE SUSPENSION, ROLL SUSPENSION working together.
ROLL1=Total roll over DIVE SUSPENSION
ROLL2=Total roll over ROLL SUSPENSION
ROLLT=Total roll over TIRE SUSPENSION ROLL=Total roll. ROLL=ROLL1+ROLL2+ROLLT.

CC1=Camber change at wheel due to ROLL1
CC2=Camber change at wheel due to ROLL2
CCT=Camber change at wheel due to ROLLT CC=Resultant camber change at wheel due to ROLL. CC=CC1+CC2+CCT.

LF=Lateral Force acting on the CG
WR=Effective wheel rate at roll including all factors such as anti-roll bars or swaybars if there are any.
TRACK=width of car from center of one wheel to center of another wheel.
WR1=Effective wheel rate of the dive suspension at roll including all factors such as anti-roll bars or swaybars if there are any.
WR2=Effective wheel rate of the dive suspension at roll including all factors such as anti-roll bars or swaybars if there are any.

Equations for Wheel Camber Behavior at Roll

The wheel camber versus body roll behavior of each suspension can be analyzed with the existing methods for each suspension. First the design parameters, such as roll center locations, roll center movements, roll rates, wheel camber versus body roll curves, for each suspension can be found by use of the existing geometric and analytical methods. Then those parameters are combined with the following relations to analyze the resulting wheel camber versus body roll behavior of the inventive suspension The analysis starts with the following relations and definitions:

$$ROLL1 = R1 \times LGs \qquad (1)$$

$$ROLL2 = R2 \times LGs \qquad (2)$$

$$ROLLT = RT \times LGs \qquad (3)$$

Camber rate at wheel due to DIVE SUSPENSION is:

$$C1 = CC1/LGs = (CC1/ROLL1) \times R1 \qquad (4)$$

Camber rate at wheel due to ROLL SUSPENSION is:

$$C2 = CC2/LGs = (CC2/ROLL2) \times R2 \qquad (5)$$

Camber rate at wheel due to TIRE SUSPENSION is:

$$CT = CCT/LGs = (CCT/ROLLT) \times RT \text{ Since CCT/} \\ ROLLT=1 \text{ at all times, then } CT=RT \text{ at all times also.} \qquad (6)$$

Camber Factor
A Camber Factor (CF) is defined as, $$CF = (R2 \times C2)/((R1 \times C1) + (RT \times CT)) \qquad (7)$$

$$CF = (R2 \times C2)/((R1 \times C1) + (RT^2)), \text{ since } CT=RT \qquad (8)$$

This Camber Factor is a useful parameter that links the suspension kinetic and kinematics with the camber response of the suspension. When CF=1 the wheels will stay at a fixed angle with respect to the ground at roll. When CF>1 the wheels will camber into (camber gain) the turn at roll. When CF<1 the wheels will camber out (camber loss) of the turn at roll.

Simplified Camber Factor

For simplification of the design process, as it is commonly practiced, the tire suspension (deflection due to tire) can be neglected. This is only done to make the complicated design and analysis process simpler, but if possible one should avoid neglecting the tire suspension. A Simplified Camber Factor (SCF) that does not include the effects of the tire is as follows, $$SCF = (R2 \times C2)/(R1 \times C1) \qquad (9)$$

SCF>CF at all times since it ignores the tire roll and camber loss due to that roll. Overall SCF can relate the dive suspension 16 and the roll suspension 18 directly to each other without the effects of the tire.

Again for simplification, a common practice is the process of dividing the suspension design into two main sections: kinetics and kinematics. Where kinetics focuses on the dynamics of the system and kinematics focuses on the geometry of the system. However, for the inventive suspensions, both kinetics and kinematics designs depend on each other far more than in prior art suspension designs. Inventive suspension kinetics and kinematics isolate the response to vertical loads that cause bump and dive motion from the lateral loads that cause roll motion. The inventive suspensions 10 lock out/isolate the roll suspension 18 from vertical loads with use of the locking linkage 38 that directs the vertical loads (or loads that are perpendicular to the ground when on a non-level ground) from each side of the vehicle to the other, thus balancing/canceling the forces due to vertical loading and preventing/minimizing the roll suspension from moving due to vertical loads. This prevents/minimizes the undesirable effects of the roll suspension during dive and bump scenarios.

The inventive suspensions allow both roll and dive suspensions 18, 16 to respond at lateral loads resulting in a coupled camber angle control of the wheel from both suspensions. Since the roll suspension 18 doesn't affect dive, it can be set for extreme camber recovery at roll to recover the camber loss at roll due to the dive suspension response and the tire deflection. The inventive suspensions 10 differ from other existing suspension designs/types/systems in that they use the two suspensions 16, 18 designs in series during roll, where during roll each design has its own kinetic and kinematic characteristics controlled separately. The fact that both suspension designs 16, 18 have their own kinetic and kinematic control system allows the roll suspension 18 to be locked out completely at dive and the dive suspension 16 to work with its own kinetic and kinematic controls without the effects of the roll suspension 18.

Thus in an attempt to link the two suspensions 16, 18 for resultant wheel camber at roll, the following Dynamic Camber Factor (DCF) and Kinematic Camber Factor (KCF) are defined:

$$SCF = DCF \times KCF \quad (10)$$

Dynamic Camber Factor

Substituting the camber rates (C1, C2) into the equation for Simplified Camber Factor (SCF) yields, $$SCF = (R2^2 \times CC2/ROLL2)/(R1^2 \times CC1/ROLL1) \quad (11)$$

Since CC1 and CC2 are defined by the suspension geometry (kinematics) if the terms in equation (11) are reorganized to separate the geometric terms we get:

$$SCF = [(R2^2/ROLL2)/(R1^2/ROLL1)] \times (CC2/CC1) \quad (12)$$

Plugging in equations (1), (2) and (3) and simplifying yields, $$SCF = (R2/R1) \times (CC2/CC1) \quad (13)$$

The first term in this equation relates to the roll rates and is included in the kinetic design and analysis. Thus, to describe and identify the kinetics effect on the Simplified Camber Factor (SCF), we define the first term in the equation (13), the Dynamic Camber Factor (DCF).

$$DCF = R2/R1 \quad (14)$$

With the inventive suspension 10 the camber curves can be modified kinetically by changing the ratios of the two suspension roll rates. At the practical level this would allow the suspension tuner to change the camber curves of a vehicle significantly by changing spring rates, torsion bar rates, swaybar rates and/or dampening rates.

The kinematics of the system could still limit the designers' choice of roll rates and camber curves. A vehicle with a proper kinematics design that has the roll centers for both suspensions balanced with each other and moving very little through dive and roll could be adjusted over a wider range of roll rates and camber curves without causing instability.

Kinematic Camber Factor

The second term in equation (13) relates to the camber curves and is included in the kinematics design and analysis. Thus to describe and identify the effects of the kinematics on the Simplified Camber Factor, we define the second term in equation (13) the Kinetics Camber Factor (KCF).

$$KCF = CC2/CC1 \quad (15)$$

The Dynamic and Kinematic Camber Factors are based on ignoring the tire deflection, thus they can only be used with the Simplified Camber Factor, which is also based on ignoring the deflection in the tire.

Plugging back into the Simplified Camber Factor (9), $$SCF = DCF \times KCF = (R2/R1) \times (CC2/CC1), \text{ which proves equation (13) is true to the definition of Simplified Camber Factor (SCF) and the related equation (9).} \quad (16)$$

Equations for Body/Chassis Behavior at Roll

Although the body roll can be calculated individually for each suspension and combined as the sum of both, the location of the effective geometric roll center is still very important to know. This is calculated as follows.

$$\text{Roll Moment} = [\text{Distance RC to CG}] \times LF \quad (17)$$

$$\text{Roll Resisting Moment} = ((WR \times Track^2)/2) \times ROLL \quad (18)$$

At equilibrium Roll Moment is equal to Roll Resisting Moment thus, $$ROLL = (2 \times [\text{Distance RC to CG}] \times LF)/(WR \times Track^2) \quad (19)$$

This can be written separately for both roll and dive suspensions combined in series, $$WR = (WR1 \times WR2)/(WR1 + WR2) \text{ and} \quad (20)$$

$$ROLL = ROLL1 + ROLL2 \quad (21)$$

Combining these equations, and excluding the tire suspension and other factors as it is done with the existing geometric roll center calculation methods, the effective combined roll center location with respect to the center of gravity is:

$$[\text{RC to CG}] = (WR1 \times [\text{RC2 to CG}] + WR2 \times [\text{RC1 to CG}])/(WR2 + WR1). \quad (22)$$

All of these equations are based on the initial simplified model. The dampening rates have been excluded but can be included and driven based on these formulas and relations.

Other factors such as the linear grip vs. lateral grip should be considered to find an ideal result for the desired application when both maximum linear and lateral grip leading camber curves can't be achieved simultaneously. This would vary from one race track to another as well as from one driver to another. The design might also be limited due to vehicle packaging, allowed degrees of body roll as well as many other factors.

The inventive suspension system 10 provides close to ideal camber control but it may still require a compromise between linear and lateral grip, over many different scenarios. However, this compromise is much smaller than in any prior art suspension systems, which leads to much better vehicle performance and tire life.

Although several embodiments have been described in detail for purposes of illustration, various modifications may be made without departing from the scope and spirit of the invention. Accordingly, the invention is not to be limited, except as by the appended claims.

What is claimed is:

1. A suspension system for a wheel or ski having two degrees of freedom with respect to a body of a vehicle, comprising:
    a roll suspension mechanism pivotally attached to the body, the roll suspension mechanism providing a pre-determined amount of camber control to the wheel or ski during roll and one-wheel bump motion;
    a dive suspension mechanism attached to the wheel or ski, the dive suspension mechanism providing a pre-determined amount of camber control to the wheel or ski during dive and bump motion;
    a suspension linkage connecting the roll suspension mechanism to the dive suspension mechanism; and
    a locking linkage connected at a first end to the roll suspension mechanism and at an opposite second end to an adjacent roll suspension mechanism on an adjacent wheel or ski, the locking linkage restricting movement of the roll suspension mechanism in opposition to movement of the adjacent roll suspension mechanism so as to lock out the roll suspension mechanism during dive motion such that only the dive suspension mechanism is responsive, and to activate the roll suspension mechanism in tandem with the adjacent roll suspension mechanism during roll or one-wheel bump motion such that both the dive and roll suspension mechanisms are simultaneously responsive.

2. The suspension system of claim 1, wherein the vehicle comprises two or more wheels or skis, each having dive suspension and roll suspension mechanisms associated therewith.

3. The suspension system of claim 1, wherein the suspension linkage comprises upper and lower control arms, an a-arm, a strut, a swing arm, an I-beam or a trailing arm.

4. The suspension system of claim 3, wherein the lower control arm of the suspension linkage connects an underside of the body to a lower end of a strut in the dive suspension mechanism and the upper control arm of the suspension linkage connects a lower portion of the body to an upper end of the strut in the dive suspension mechanism.

5. The suspension system of claim 1, wherein the dive suspension mechanism comprises an adjustable strut, dampener and spring assembly.

6. The suspension system of claim 5, wherein the dive suspension mechanism further comprises a dive upright attached to the wheel or ski, upper and lower frame arms connected to upper and lower ends of the dive upright, and a frame upright having an upper end connected adjacent to a distal end of the upper frame arm and a lower end connected adjacent to a distal end of the lower frame arm, in relation to the dive upright, and wherein a lower end of the strut, dampener and spring assembly is connected adjacent to the lower end of the dive upright and an upper end of the strut, dampener and spring assembly is connected adjacent to the upper end of the frame upright.

7. The suspension system of claim 6, wherein the suspension linkage is connected to both the upper and lower ends of the frame upright.

8. The suspension system of claim 1, wherein the roll suspension mechanism comprises a roll bell crank pivotally attached to an upper portion of the body and an adjustable roll dampener connecting the roll bell crank to another portion of the body such that the roll dampener regulates pivotal movement of the roll bell crank, and a push rod connecting the roll bell crank to a lower end of the dive suspension mechanism.

9. The suspension system of claim 8, wherein the locking linkage is connected to the roll bell crank and restricts pivotal movement thereof.

10. The suspension system of claim 1, wherein the roll suspension mechanism comprises a pair of hydraulic shocks mounted on opposite sides of the body such that an upper end of each hydraulic shock is attached to an upper portion of the body and a lower end of each hydraulic shock is attached proximate to a lower end of the dive suspension mechanism.

11. The suspension system of claim 10, wherein the locking linkage is a hydraulic linkage between the pair of hydraulic shocks such that the pair of hydraulic shocks are prevented from both extending or contracting simultaneously.

12. A suspension system for a pair of wheels or skis having two degrees of freedom with respect to a body of a vehicle, comprising:
a roll suspension mechanism attached to the body, the roll suspension mechanism providing a pre-determined amount of camber control to the pair of wheels or skis during roll and one-wheel bump motion;
a pair of dive suspension mechanisms attached to each of the pair of wheels or skis, each of the pair of dive suspension mechanisms comprising an adjustable strut, dampener and spring assembly and providing a pre-determined amount of camber control to one of the pair of wheels or skis during dive and bump motion, each of the pair of dive suspension mechanisms further comprising a dive upright attached to one of the pair of wheels or skis, upper and lower frame arms connected to upper and lower ends of the dive upright, and a frame upright having an upper end connected adjacent to a distal end of the upper frame arm and a lower end connected adjacent to a distal end of the lower frame arm, in relation to the dive upright, and wherein a lower end of the strut, dampener and spring assembly is connected adjacent to the lower end of the dive upright and an upper end of the strut, dampener and spring assembly is connected adjacent to the upper end of the frame upright;
a suspension linkage connecting the roll suspension mechanism to the dive suspension mechanism; and
a locking linkage connected at a first end to the roll suspension mechanism and at an opposite second end to an adjacent roll suspension mechanism on an adjacent wheel or ski, the locking linkage restricting movement of the roll suspension mechanism in opposition to movement of the adjacent roll suspension mechanism so as to lock out the roll suspension mechanism during dive motion such that only the dive suspension mechanism is responsive, and to activate the roll suspension mechanism in tandem with the adjacent roll suspension mechanism during roll or one-wheel bump motion such that both the dive and roll suspension mechanisms are simultaneously responsive.

13. The suspension system of claim 12 wherein the suspension linkage comprises upper and lower control arms, an a-arm, a strut, a swing arm, an I-beam or a trailing arm.

14. The suspension system of claim 13, wherein the lower control arm of the suspension linkage connects an underside of the body to a lower end of a strut in the dive suspension mechanism and the upper control arm of the suspension linkage connects a lower portion of the body to an upper end of the strut in the dive suspension mechanism.

15. The suspension system of claim 12, wherein the suspension linkage is connected to both the upper and lower ends of the frame upright.

16. The suspension system of claim 12, wherein the roll suspension mechanism comprises a roll bell crank pivotally attached to an upper portion of the body and an adjustable roll dampener connecting the roll bell crank to another portion of the body such that the roll dampener regulates pivotal movement of the roll bell crank, and a push rod connecting the roll bell crank to a lower end of the dive suspension mechanism.

17. The suspension system of claim 16, wherein the locking linkage is connected to the roll bell crank and restricts pivotal movement thereof.

18. The suspension system of claim 12, wherein the roll suspension mechanism comprises a pair of hydraulic shocks mounted on opposite sides of the body such that an upper end of each hydraulic shock is attached to an upper portion of the body and a lower end of each hydraulic shock is attached proximate to a lower end of the dive suspension mechanism.

19. The suspension system of claim 18, wherein the locking linkage is a hydraulic linkage between the pair of hydraulic shocks such that the pair of hydraulic shocks are prevented from both extending or contracting simultaneously.

20. A suspension system for a pair of wheels or skis having two degrees of freedom with respect to a body of a vehicle, comprising:
- a roll suspension mechanism attached to the body, the roll suspension mechanism providing a pre-determined amount of camber control to the pair of wheels or skis during roll and one-wheel bump motion;
- a pair of dive suspension mechanisms attached to each of the pair of wheels or skis, each of the pair of dive suspension mechanisms providing a pre-determined amount of camber control to the pair of wheels or skis during dive and bump motion;
- the roll suspension mechanism comprising a pair of roll bell cranks pivotally attached to an upper portion of the body and a pair of adjustable roll dampeners connecting each roll bell crank to another portion of the body such that the roll dampeners regulate pivotal movement of the roll bell cranks, and a push rod connecting each roll bell crank to a lower end of each dive suspension mechanism;
- a suspension linkage connecting the roll suspension mechanism to the dive suspension mechanism; and
- a locking linkage connected at a first end to one of the pair of roll bell cranks and at an opposite second end to the other of the pair of roll bell cranks, the locking linkage restricting pivotal movement of the pair of roll bell cranks in opposition to one another so as to lock out the roll suspension mechanism during dive motion such that only the dive suspension mechanism is responsive, and to activate the roll suspension mechanism during roll or one-wheel bump motion such that both the dive and roll suspension mechanisms are simultaneously responsive.

21. The suspension system of claim 1, wherein the suspension linkage comprises upper and lower control arms, an a-arm, a strut, a swing arm, an I-beam or a trailing arm, wherein the lower control arm of the suspension linkage connects an underside of the body to a lower end of a strut in the dive suspension mechanism and the upper control arm of the suspension linkage connects a lower portion of the body to an upper end of the strut in the dive suspension mechanism.

22. The suspension system of claim 20, wherein the dive suspension mechanism comprises an adjustable strut, dampener and spring assembly.

23. The suspension system of claim 22, wherein the dive suspension mechanism further comprises a dive upright attached to the wheel or ski, upper and lower frame arms connected to upper and lower ends of the dive upright, and a frame upright having an upper end connected adjacent to a distal end of the upper frame arm and a lower end connected adjacent to a distal end of the lower frame arm, in relation to the dive upright, and wherein a lower end of the strut, dampener and spring assembly is connected adjacent to the lower end of the dive upright and an upper end of the strut, dampener and spring assembly is connected adjacent to the upper end of the frame upright.

24. The suspension system of claim 23, wherein the suspension linkage is connected to both the upper and lower ends of the frame upright.

25. A suspension system for a pair of wheels or skis having two degrees of freedom with respect to a body of a vehicle, comprising:
- a roll suspension mechanism attached to the body, the roll suspension mechanism providing a pre-determined amount of camber control to the pair of wheels or skis during roll and one-wheel bump motion;
- a pair of dive suspension mechanisms attached to each of the pair of wheels or skis, each of the pair of dive suspension mechanisms providing a pre-determined amount of camber control during dive and bump motion;
- the roll suspension mechanism comprising a pair of hydraulic shocks mounted on opposite sides of the body such that an upper end of each hydraulic shock is attached to an upper portion of the body and a lower end of each hydraulic shock is attached proximate to a lower end of the dive suspension mechanism on each wheel or ski;
- a suspension linkage connecting the roll suspension mechanism to the dive suspension mechanism; and
- a locking linkage connected to the roll suspension mechanism comprising a hydraulic linkage between the pair of hydraulic shocks, the hydraulic linkage preventing the pair of hydraulic shocks from both extending or contracting simultaneously so as to lock out the roll suspension mechanism during dive motion such that only the dive suspension mechanism is responsive, and to activate the roll suspension mechanism during roll or one-wheel bump motion such that both the dive and roll suspension mechanisms are simultaneously responsive.

26. The suspension system of claim 25, wherein the suspension linkage comprises upper and lower control arms, an a-arm, a strut, a swing arm, an I-beam or a trailing arm, wherein the lower control arm of the suspension linkage connects an underside of the body to a lower end of a strut in the dive suspension mechanism and the upper control arm of the suspension linkage connects a lower portion of the body to an upper end of the strut in the dive suspension mechanism.

27. The suspension system of claim 25, wherein the dive suspension mechanism comprises an adjustable strut, dampener and spring assembly, wherein the dive suspension mechanism further comprises a dive upright attached to the wheel or ski, upper and lower frame arms connected to upper and lower ends of the dive upright, and a frame upright having an upper end connected adjacent to a distal end of the upper frame arm and a lower end connected adjacent to a distal end of the lower frame arm, in relation to the dive upright, and wherein a lower end of the strut, dampener and spring assembly is connected adjacent to the lower end of the dive upright and an upper end of the strut, dampener and spring assembly is connected adjacent to the upper end of the frame upright.

28. The suspension system of claim 27, wherein the suspension linkage is connected to both the upper and lower ends of the frame upright.

29. A suspension system for a pair of adjacent wheels or skis, the suspension system having two degrees of freedom with respect to a body of a vehicle, comprising:
- a first dive suspension mechanism comprising an adjustable strut, a dampener and a spring, wherein the dampener is attached to a first of the pair of wheels or skis and the strut is pivotally connected to the body by a first suspension linkage;
- a second dive suspension mechanism comprising a second adjustable strut, a second dampener and a second spring, wherein the second dampener is attached to a second of the pair of wheels or skis and the second strut is pivotally connected to the body by a second suspension linkage;
- a first roll suspension mechanism comprising a roll bell crank pivotally attached to the body, a roll dampener attached at one end to the body and at another end to the roll bell crank, and a push rod connected at one end to the roll bell crank and at another end to the first dive suspension mechanism;
- a second roll suspension mechanism comprising a second roll bell crank pivotally attached to the body, a second roll dampener attached at one end to the body and at another end to the second roll bell crank, and a second push rod connected at one end to the second roll bell crank and at another end to the second dive suspension mechanism; and a locking linkage connected at one end to the roll bell crank of the first roll suspension mechanism and at an opposite second end to the second roll bell crank of the second roll suspension mechanism.

30. A suspension system for a pair of adjacent wheels or skis, the suspension system having two degrees of freedom with respect to a body of a vehicle, comprising:

a first dive suspension mechanism comprising a first frame assembly wherein an adjustable strut, dampener and spring span opposite corners of the first frame assembly, wherein one side of the first frame assembly is fixedly attached to the first of the pair of wheels or skis and an opposite second side of the first frame assembly is pivotally connected to the body by a first suspension linkage;

a second dive suspension mechanism comprising a second frame assembly wherein a second adjustable strut, a second dampener and a second spring span opposite corners of the second frame assembly, wherein one side of the second frame assembly is fixedly attached to the second of the pair of wheels or skis and an opposite second side of the second frame assembly is pivotally connected to the body by a second suspension linkage;

a first roll suspension mechanism comprising a roll bell crank pivotally attached to the body, a roll dampener attached at one end to the body and at another end to the roll bell crank, and a push rod connected at one end to the roll bell crank and at another end to the first frame assembly of the first dive suspension mechanism;

a second roll suspension mechanism comprising a second roll bell crank pivotally attached to the body, a second roll dampener attached at one end to the body and at another end to the second roll bell crank, and a second push rod connected at one end to the second roll bell crank and at another end to the second frame assembly of the second dive suspension mechanism; and a locking linkage connected at one end to the roll bell crank of the first roll suspension mechanism and at an opposite second end to the second roll bell crank of the second roll suspension mechanism.

31. A suspension system for a pair of adjacent wheels or skis, the suspension system having two degrees of freedom with respect to a body of a vehicle, comprising:

a first dive suspension mechanism comprising a first frame assembly wherein an adjustable strut, dampener and spring span opposite corners of the first frame assembly, wherein one side of the first frame assembly is fixedly attached to the first of the pair of wheels or skis and an opposite second side of the first frame assembly is pivotally connected to the body by a first suspension linkage;

a second dive suspension mechanism comprising a second frame assembly wherein a second adjustable strut, a second dampener and a second spring span opposite corners of the second frame assembly, wherein one side of the second frame assembly is fixedly attached to the second of the pair of wheels or skis and an opposite second side of the second frame assembly is pivotally connected to the body by a second suspension linkage;

a first roll suspension mechanism comprising a roll dampener, wherein the roll dampener is pivotally attached at one end to the body and at an opposite second end to the first frame assembly of the first dive suspension mechanism;

a second roll suspension mechanism comprising a second roll dampener, wherein the second roll dampener is pivotally attached at one end to the body and at an opposite second end to the second frame assembly of the second dive suspension mechanism; and a locking linkage connected at one end to the roll dampener of the first roll suspension mechanism and at an opposite second end to the second roll dampener of the second roll suspension mechanism.

32. A suspension system for a pair of adjacent wheels or skis, the suspension system having two degrees of freedom with respect to a body of a vehicle, comprising:

a first dive suspension mechanism for providing a predetermined amount of camber control to a first of the pair of wheels or skis during dive and bump motion, wherein the first dive suspension mechanism is attached to the first of the pair of wheels or skis and pivotally connected to the body by a first suspension linkage;

a second dive suspension mechanism for providing a predetermined amount of camber control to a second of the pair of wheels or skis during dive and bump motion, wherein the second dive suspension mechanism is attached to the second of the pair of wheels or skis and pivotally connected to the body by a second suspension linkage;

a first roll suspension mechanism for providing a predetermined amount of camber control to the first of the pair of wheels or skis during roll and one-wheel bump motion, wherein the first roll suspension mechanism is pivotally attached to the body and connected to the first dive suspension mechanism by a first push rod;

a second roll suspension mechanism for providing a predetermined amount of camber control to the second of the pair of wheels or skis during roll and one-wheel bump motion, wherein the second roll suspension mechanism is pivotally attached to the body and connected to the second dive suspension mechanism by a second push rod; and a locking linkage for restricting movement of the first roll suspension mechanism in opposition to movement of the second roll suspension mechanism so as to lockout both the first and second roll suspension mechanisms during dive motion and to activate both the first and second roll suspension mechanisms in tandem during roll or one-wheel bump motion, wherein the locking linkage is connected at one end to the first roll suspension mechanism and at an opposite second end to the second roll suspension mechanism.

\* \* \* \* \*